United States Patent
Kaduwela et al.

(10) Patent No.: US 11,775,262 B2
(45) Date of Patent: *Oct. 3, 2023

(54) MULTI-TECHNOLOGY VISUAL INTEGRATED DATA MANAGEMENT AND ANALYTICS DEVELOPMENT AND DEPLOYMENT ENVIRONMENT

(71) Applicant: Kavi Associates, LLC, Barrington, IL (US)

(72) Inventors: Vjitha P. Kaduwela, South Barrington, IL (US); Rajesh Inbasekaran, Hawthorn Woods, IL (US)

(73) Assignee: Kavi Associates, LLC, Barrington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/013,763

(22) Filed: Sep. 7, 2020

(65) Prior Publication Data
US 2020/0409666 A1  Dec. 31, 2020

Related U.S. Application Data

(63) Continuation of application No. 16/188,474, filed on Nov. 13, 2018, now Pat. No. 10,768,906, which is a continuation of application No. 15/405,061, filed on Jan. 12, 2017, now Pat. No. 10,162,608.

(60) Provisional application No. 62/277,759, filed on Jan. 12, 2016.

(51) Int. Cl.
*G06F 8/38* (2018.01)
*G06F 8/34* (2018.01)
*G06F 8/35* (2018.01)
*G06F 16/28* (2019.01)
*G06F 8/36* (2018.01)

(52) U.S. Cl.
CPC .................. *G06F 8/34* (2013.01); *G06F 8/35* (2013.01); *G06F 8/36* (2013.01); *G06F 16/283* (2019.01)

(58) Field of Classification Search
CPC . G06F 8/34; G06F 8/35; G06F 16/283; G06F 8/36; G06F 8/38
See application file for complete search history.

(56) References Cited

U.S. PATENT DOCUMENTS

| | | | |
|---|---|---|---|
| 8,904,299 B1 | 12/2014 | Owen et al. | |
| 9,921,827 B1* | 3/2018 | Evans | G06F 8/71 |
| 2003/0145016 A1* | 7/2003 | Bello | G06Q 30/06 |

(Continued)

OTHER PUBLICATIONS

Data Blending For Dummies, Michael Wessler et al., 2015 (Year: 2015).*

(Continued)

*Primary Examiner* — Hang Pan
*Assistant Examiner* — Noor Alkhateeb
(74) *Attorney, Agent, or Firm* — Vedder Price P.C.

(57) ABSTRACT

The present disclosure relates to a system for providing a multi-technology visual integrated data management and analytics development and deployment environment. In an embodiment, the system is configured to generate executable code suitable to carry out a data analytics request using a first software platform, migrate executable code for the first software platform to a second software platform, and cause executable code to be processed on the first or second software platform to perform the data analytics request.

6 Claims, 60 Drawing Sheets

(56) References Cited

U.S. PATENT DOCUMENTS

| | | | |
|---|---|---|---|
| 2007/0288414 A1 | 12/2007 | Barajas et al. | |
| 2008/0046868 A1* | 2/2008 | Tsantilis | G06F 8/36 |
| | | | 717/136 |
| 2010/0333078 A1 | 12/2010 | Sun et al. | |
| 2011/0004808 A1 | 1/2011 | Anandakumar et al. | |
| 2011/0320460 A1* | 12/2011 | Fankhauser | G06Q 10/10 |
| | | | 707/748 |
| 2014/0040855 A1* | 2/2014 | Wang | G06F 9/4494 |
| | | | 717/107 |
| 2014/0068553 A1* | 3/2014 | Balasubramanian | G06F 8/34 |
| | | | 717/109 |
| 2015/0256475 A1* | 9/2015 | Suman | G06F 9/5027 |
| | | | 709/226 |
| 2015/0269172 A1 | 9/2015 | Moden | |
| 2017/0102925 A1* | 4/2017 | Ali | G06F 8/30 |
| 2017/0178019 A1* | 6/2017 | Duggan | G06N 7/00 |

OTHER PUBLICATIONS

Alteryx Predictive Analytics for Oracle R, Sep. 2015 (Year: 2015).*
PCT International Search Report corresponding to International Application Serial No. PCT/US2017/013226 dated Apr. 27, 2017; 3 pages.
Written Opinion corresponding to International Application Serial No. PCT/US2017/013226 dated Apr. 27, 2017; 5 pages.

* cited by examiner

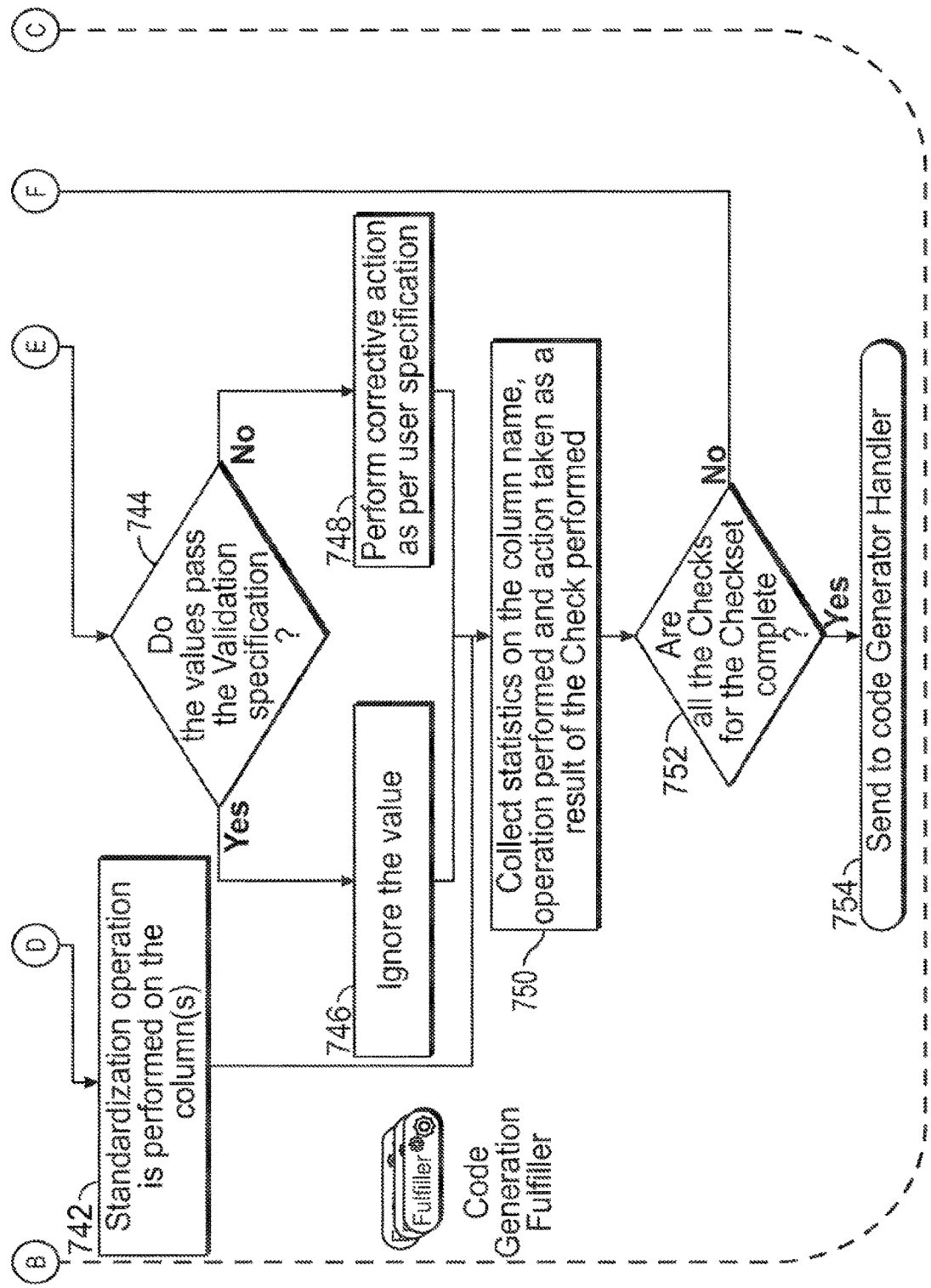

1600

LOAD_LOAD_DETAILS_BR

General | Audit | Organization | Version Control | Security | Authentication | Mode Details | Inst Id*
5841df4fe4b0a6ed719c7eab Name*
Load_Loan_Details_BR Description ← 1602

SAVE  CANCEL

FIG. 16

Plexa                              1702 → Save

TRANSFORMATION

AUTHORIZATION        test1 x

MIGRATE JOB

Mode*
- Greenplum
- Amazon Redshift
- Spark Streaming
- Spark With Scala
- Postgre SQL

2802

Version*
| 1.6 |
| 1.6 |
| 2.0 |

2804

2800

Instance*

Add Instance
- Amazon Development Server
- Amazon Development New Server
- Amazon_test

2806

New Job Name*

New Folder Name*

Browse

MIGRATE    CANCEL

FIG. 28

REFINANCE CONDITION

General | Specifications condition_1

Name* ⓘ

Refinance Condition — 3002

Description ⓘ

Check if the loan status is current applied for home or small business purposes and the amount is greater than 25k
— 3004

SAVE    CANCEL

FIG. 30

REFINANCE CONDITION

General | Specifications

Hide Rules

Group 1
Used
- Loan Status ▼ | Equal to ▼ | Value(Current)
- Loan Amount ▼ | Greater than or equal ▼ | Value(25000)

Group 1.1
Used
- Loan Purpose ▼ | Equal to ▼ | Value(house)
- Loan Amount ▼ | Equal to ▼ | Value(small business)

{ ["Loan Status" = Value(Current) ) and ("Loan Amount" >= Value(25000) ) and
 ( ("Loan Purpose" = "Value(house) or ["Loan Purpose" = "Value(small_business)] )}    3100

SAVE    CANCEL

BUSINESS RULES

| General | Column Mapping | Business Rule Parameters | Business Rule Details | Ruleset Variable Mapping |

Business Rule Project*
Loading Club

Ruleset*
Loan_ruleset

CANCEL   SAVE

| Attribute | Checks |
|---|---|
| Loan Status | Vid_Null_Check |
| Loan Status | Std_Lower_Case |
| Loan Purpose | Std_Remove_All_Space |
| Loan Purpose | Std_Trim |
| Loan Purpose | Vid_Null_Not_Allowed |
| Loan Amount | Std_Proper_Case |
| Loan Amount | Vid_Null_Not_Allowed |
| Interest Rate | Vid_Negative |
| Interest Rate | Vid_Not_Null |
| URL | Vid_Less_Than_0 |
| URL | Vid_URL-Format_URL |
| URL | Std_Lower_Case |
| | Std_Remove_All_Space |

DQ_VALIDATION

| General | Column Mapping | Data Checks Parameters | Checks Variables Mapping | Temporary Storage |

Checks Project* ⓘ 5302

Loan ▸

CheckSet* ⓘ 5304

Loan_Detail_Validation ▸

SAVE    CANCEL

| Attribute Name | Check Name |
|---|---|
| Loan Status | Vid_Null_Check |
| Loan Purpose | Vid_Null_Not_Allowed |
| Loan Amount | Vid_Null_Not_Null,Vid_Not_Null,Vid... |
| Interest Rate | Vid_Not_Null,Vid_Less_Tha... |
| URL | Vid_URL_Format_URL |
| Loan Payment Plan | Vid_Number_Of_Character |

| File Name | Column Name |
|---|---|
| business_rules1 | member_id |
| business_rules1 | emp_title |
| business_rules1 | emp_length |
| business_rules1 | home_ownership |
| business_rules1 | annual_inc |
| business_rules1 | id |

DQ_VALIDATION

General | Column Mapping | Data Checks Parameters | Checks Variables Mapping | Temporary Storage 5402  5404  5400  5406

SAVE  CANCEL

MULTI-TECHNOLOGY VISUAL INTEGRATED DATA MANAGEMENT AND ANALYTICS DEVELOPMENT AND DEPLOYMENT ENVIRONMENT

CROSS-REFERENCE TO RELATED APPLICATIONS

The present utility patent application is a continuation of U.S. patent application Ser. No. 16/188,474, filed Nov. 13, 2018; which is a continuation of U.S. patent application Ser. No. 15/405,061, filed Jan. 12, 2017 and now U.S. Pat. No. 10,162,608; which claims priority to and the benefit of U.S. Provisional Patent Application Ser. No. 62/277,759, filed Jan. 12, 2016, the contents of each of which are incorporated herein by reference in their entireties.

FIELD OF THE DISCLOSURE

The present invention generally relates to a system and method for providing a comprehensive data management and analytics solution, and more particularly is directed to a unique system and method implemented using software on one or more computing devices for seamlessly integrating multiple data management and analytics technologies into a universal package.

BACKGROUND

Data analytics refers to techniques and processes for qualitatively and quantitatively evaluating data so as to create value (i.e., by enhanced productivity or obtaining insight into a business). Often, extremely large and complex data sets (referred to as big data) may be generated based on an item of interest, such as the functioning of a business or market segment. Through data analytics, information is extracted, categorized, and processed so as to obtain insight and value from the data, such as by identifying meaningful or significant patterns and trends.

A number of different data analytics tools and techniques currently exist. Generally, these tools are in the form of computer-executable software programs. Due to the amount of processing required to perform a meaningful analysis on big data, it is simply impractical (or impossible) for a human to perform data analytics without the assistance of a computational device. As a result, existing data management and analytics solutions are hard-coded into separate software platforms, such as Greenplum, Amazon Redshift, Spark Streaming, Spark with Scala, and PostgreSQL. Each of these platforms provides valuable tools for performing data analytics, but software provided by different vendors is generally incompatible. Users typically create workflows that perform numerous operations using a given platform, enabling the user to perform the same type of analysis repeatedly on different data sets. This requires that the user understand the interface of the user's chosen software platform, and often requires that the user be capable of writing executable code (i.e., in the form of a scripting language) to accomplish necessary tasks using the platform. As a result, users must spend significant time learning and becoming comfortable working with each separate software platform that they wish to use.

However, the various software platforms offer different features and may be provided at different prices. As a result, users periodically desire to use a new software platform, or a platform with which they have not previously worked. In order to migrate from one software package to another, the user must recreate their entire workflow (which typically involves obtaining assistance from a programmer to write unique code compatible with the new software package). Further, it is practically impossible for a user to utilize multiple software products in a single workflow, as hard-coded translation scripts are needed for each separate software package. The user must either be capable of programming the scripts him or herself or obtain assistance from a developer. Significant programming time is required to create or modify each such composite workflow. Such hard-coded and fragmented solutions are difficult and expensive to maintain and are exposed to technology and skill obsolescence risks. For example, a user must devote significant time to learning new software platforms, or spend money to hire someone who is competent in the new platform. Hard-coded workflows are difficult to migrate to newer technologies that may become available in the future, particularly if the original creator of the workflow (i.e., the programmer) is not available or does not recall how the workflow was created.

Accordingly, a need exists for a single, comprehensive technological solution providing both data management (i.e., data acquisition, data integration, data quality, business rules and data governance, etc.) and analytics (i.e., reporting and analytical models) tools enabling the integration with multiple proprietary software platforms provided by multiple vendors.

SUMMARY

The presently described apparatus and method overcome the disadvantages of the prior art by providing a novel system and method for seamlessly integrating multiple data management and analytics technologies into a universal package.

An embodiment of the present invention provides a system for providing a multi-technology visual integrated data management and analytics development and deployment environment, the system comprising a processor communicatively coupled to a non-transitory memory, a display, and an input device, the non-transitory memory containing a program configured to call the processor to execute the steps of:

rendering a graphical user interface and displaying said graphical user interface to a user of said system, said graphical user interface presenting said user with an option for generating code for a first software platform, said code configured to perform one or more data analytics operations when executed by said first software platform;

receiving an instruction from said user of said system via said input device;

upon receipt of said instruction, creating a code generation request specifying an identity of the first software platform, a plurality of nodes, a plurality of node properties for said plurality of nodes, and an execution order for said plurality of nodes;

retrieving a plurality of codes template containing executable code and placeholders corresponding to the plurality of nodes based on said identity of the first software platform;

based on said execution order, identifying parallel and dependent ones of said plurality of nodes and determining a node order sequence;

merging said executable code of said plurality of templates together based on the node sequence order to create generated executable code;

replacing said placeholders in said generated executable code based on said node properties; and displaying said generated executable code to said user via said display.

An embodiment provides a system for providing a multi-technology visual integrated data management and analytics development and deployment environment, the system comprising:

an internal network comprising an application server, an engine, and a metadata server communicatively coupled together;

an authorization server communicatively coupled to said engine;

a client node communicatively coupled to said engine and a compute server;

and a client device comprising a display and an input device communicatively coupled to said application server, wherein said client device is configured to receive a graphical user interface from said application server, display said graphical user interface on said display, and relay input from said input device to said application server;

wherein said application server is configured to render said graphical user interface;

wherein said engine is configured to implement:

a backend services module configured to receive a command from said application server based on said input and create a code generation request based on said input comprising an identity of a software platform, a plurality of nodes, a plurality of node properties for said plurality of nodes, and an execution order for said plurality of nodes;

a code generation fulfiller configured to retrieve a plurality of code templates containing executable code and placeholders corresponding to the plurality of nodes based on said identity of the software platform, identify parallel and dependent ones of said plurality of nodes and determine a node order sequence based on said execution order, merge said executable code of said plurality of templates based on the node sequence order to create generated executable code, and replace said placeholders in said generated executable code based on said node properties; and a code generation handler configured to receive said code generation request from said backend services module, invoke said code generation fulfiller, and relay said generated executable code to said backend services module.

BRIEF DESCRIPTION OF THE DRAWINGS

The following disclosure as a whole may be best understood by reference to the provided detailed description when read in conjunction with the accompanying drawings, drawing descriptions, abstract, background, field of the disclosure, and associated headings. Identical reference numerals, when found on different figures, identify the same elements or functionally equivalent elements. The elements listed in the abstract are not referenced but nevertheless refer by association to the elements of the detailed description and associated disclosure.

FIGS. 8-28 are screen shots of a graphical user interface for creating and executing jobs, in accordance with an embodiment of the present invention;

FIGS. 29-40 are screen shots of a graphical user interface for creating and working with business rules, in accordance with an embodiment of the present invention; and FIGS. 41-54 are screen shots of a graphical user interface for performing data quality checks, in accordance with an embodiment of the present invention.

DETAILED DESCRIPTION

Figure 1:
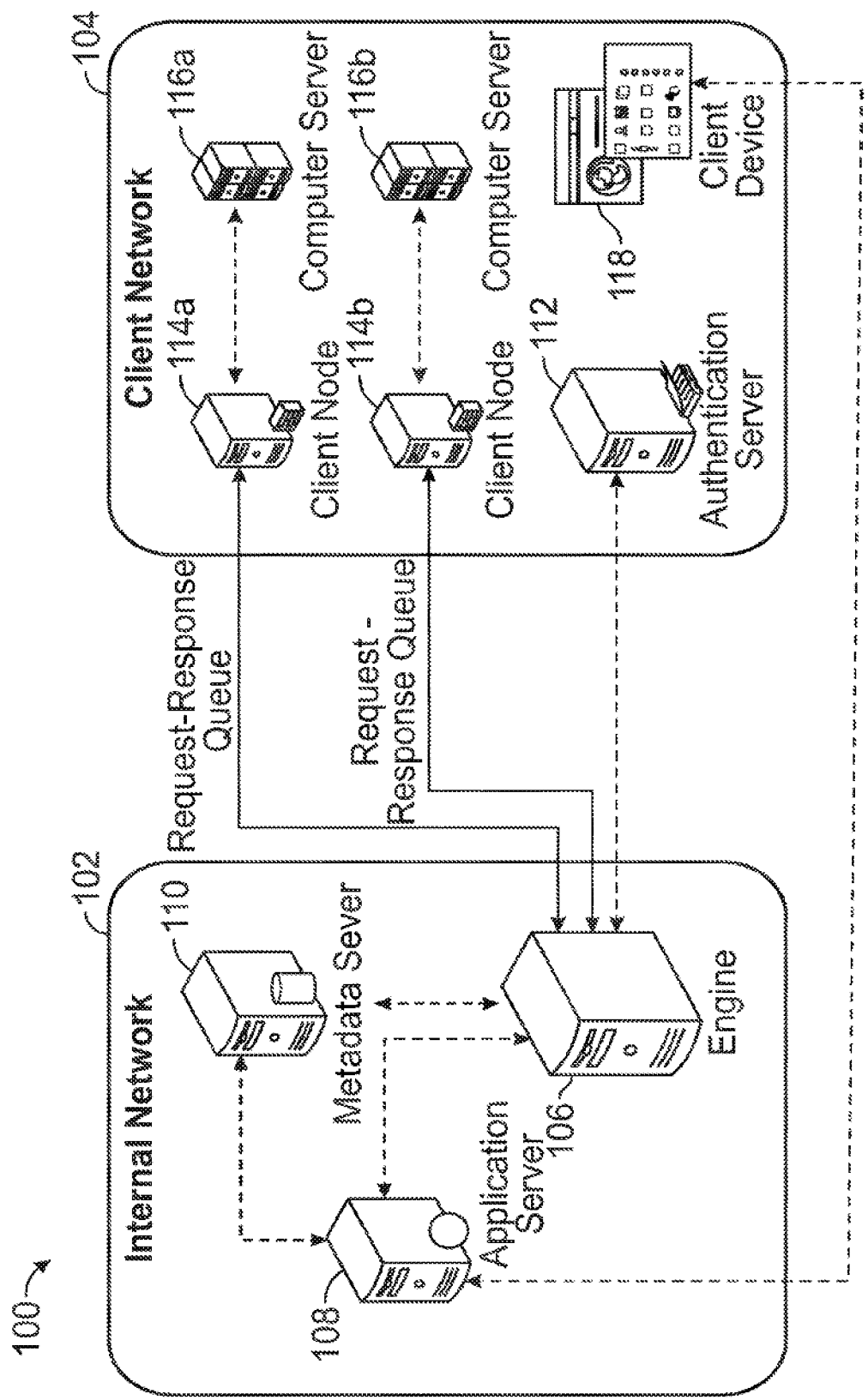
FIG. 1 is an exemplary hardware diagram wherein a system and method in accordance with the present invention can be implemented.

The present disclosure is not limited to the particular details of the system and method depicted and described herein, and other modifications and applications may be contemplated. Further changes may be made in the system or methods without departing from the true spirit and scope of the disclosure herein involved. It is intended, therefore, that the subject matter in this disclosure should be interpreted as illustrative, not in a limiting sense.

For purposes of contrasting various embodiments with the prior art, certain aspects and advantages of these embodiments are described where appropriate herein. Of course, it is to be understood that not necessarily all such aspects or advantages may be achieved in accordance with any particular embodiment. Modifications and variations can be made by one skilled in the art without departing from the sprit and scope of the invention. Moreover, any one or more features of any embodiment may be combined with any one or more other features of any other embodiment, without departing from the scope of the invention.

Disclosed herein is a system and method that seamlessly integrates multiple data management and analytics technologies into a universal package. By using a single interface, a user is able to utilize software platforms produced by multiple vendors that are not directly compatible with one another. Further, the user is able to specialize in the single interface rather than needing to familiarize him or herself with the interfaces of each separate platform used for processing tasks. By interacting with the system at a logical level, and having the executable code for each separate platform created automatically by the system using predefined templates, the user does not need to be proficient in programming or using each separate platform.

The system is configured to perform several discrete tasks, including generating code to be processed by a particular software platform (also referred to herein as a "technology" or "mode"); executing code using a remote compute server (i.e., which will run the code using a particular software platform); and migrating code created to be processed using one software platform to another software platform. Using these tasks, users are able to create rule sets and check lists for performing data analysis and verification. Each of these functions is discussed separately herein.

In an embodiment, a user creates a data analytics workflow using the interface provided by a system in accordance with the present invention that is designed to be implemented on a first software platform (such as Greenplum). In doing so, the user does not interact with the first software platform directly and does not need to be familiar with the first software platform's menu or user interface. Once the workflow is created, the system is capable of automatically migrating it to a second software platform (such as Amazon Redshift) that is not directly compatible with the first software platform. This is accomplished by using pre-created templates that are included with the system to automatically migrate the workflow to the new software platform by generating the necessary executable code to run the workflow on the new platform. This is accomplished entirely through the system's interface, without the need for the user to directly write any executable code or directly interact with either software platform. In this manner, it is possible for a user to create a workflow to operate on a software platform with which the user is unfamiliar. Further, a user who is incapable of writing his or her own executable code can migrate a workflow from one platform to another (or even create a workflow involving multiple platforms) through a single interface.

Particular embodiments of the presently disclosed system and method, as well as a detailed discussion of how the foregoing steps are accomplished, are provided in the following sections.

System Diagram—Hardware

FIG. 1 illustrates a hardware configuration 100 wherein a system and method in accordance with the present invention can be implemented on one or more computing devices. The hardware configuration 100 includes an internal network 102 and a client network 104. The internal network 102 and the client network 104 are each suitable for connecting to one another and to a plurality of computing devices and each may comprise one or more networks such as a local area network (LAN), a wide area network (WAN) such as the Internet, telephone networks including telephone networks with dedicated communication links and/or wireless links, and wireless networks. In the illustrative example shown in FIG. 1, the internal network 102 and the client network 104 are each LANs and the internal network 102 is connected to the client network 104 via the Internet. As such, the internal network 102 and the client network 104 may be geographically separated. In an embodiment, the internal network 102 and/or the client network 104 comprises a plurality of separate networks (e.g., a plurality of separate LANs) that are linked together (e.g., by the Internet) such that the various elements of the internal network 102 and/or the client network 104 are geographically separated from one another. Various hardware devices (including but not limited to routers, modems, switches, etc.) may separate the elements of the hardware configuration 100, so long as the various elements are communicatively coupled together as shown in FIG. 1.

The internal network 102 comprises one or more computing devices configured to implement an engine 106, an application server 108, and a metadata server 110. While each of these elements is shown as being implemented on a separate computing device, in an embodiment, a single computing device may implement two or more of the engine 106, the application server 108, and the metadata server 110. Alternatively, in another embodiment any of these elements may be implemented on multiple computing devices (e.g., the metadata server 110 may be implemented using one server for computational tasks and a separate server for storage tasks). Each of the engine 106, the application server 108, and the metadata server 110 is connected via a suitable communication link, such as a dedicated communication line or a wireless communication link.

The client network 104 comprises one or more computing devices configured to implement an authentication server 112, one or more client nodes 114a, 114b, one or more compute servers 116a, 116b, and the user interface (UI) 118. While each of these elements are shown as being implemented on a separate computing device, in an embodiment, a single computing device may implement two or more of the authentication server 112, the client nodes 114a, 114b, the compute servers 116a, 116b, and the client device 118. Alternatively, in another embodiment any of these elements may be implemented on multiple computing devices (e.g., the authentication server 112 may be implemented using one server for computational tasks and a separate server for storage tasks). As shown, the authentication server 112 and the one or more client nodes 114a, 114b are connected to the engine 116 via a suitable communication link, such as a dedicated communication line or a wireless communication link. Similarly, the client device 118 is connected via a suitable communication link to the application server 108 and each client node 114a, 114b is connected via a suitable communication link to a respective compute server 116a, 116b.

In an embodiment, the computing devices illustrated in FIG. 1 each comprise a storage device configured to contain computer-readable instructions, central processing unit (CPU) communicatively coupled to the storage device and configured to execute the computer-readable instructions, an input/output (I/O) unit communicatively coupled to the CPU and configured to relay data to other computing devices, and a memory communicatively coupled to the CPU. The computing devices may further comprise a display device and/or one or more standard input devices such as a keyboard, a mouse, speech processing means, or a touchscreen.

The client device 118 further comprises a display device and an input device as described herein and renders a graphical user interface ("GUI") that is used to convey information to and receive information from a user. The GUI includes any interface capable of being displayed on a display device including, but not limited to, a web page, a display panel in an executable program running locally on the client device 118, or any other interface capable of being displayed to the user. The GUI may be transmitted to the client device 118 from the application server 108. In the illustrative embodiment shown in FIG. 1, in accordance with the present invention, the GUI is displayed by the client device 118 using a browser or other viewing software such as, but not limited to, Microsoft Internet Explorer, Google Chrome, Apple Safari, or Mozilla Firefox, or any other commercially available viewing software. In an embodiment, the GUI is generated using a combination of commercially available hypertext markup language ("HTML"), cascading style sheets ("CSS"), JavaScript, and other similar standards.

In the embodiment shown in FIG. 1, the GUI resides on the application server 108, which comprises a web server. The application server 108 transmits the GUI to the client device 118, which displays it to the user and obtains input from the user in response. The application server 108 is configured to interact directly with other components of the internal network 102 and indirectly with components of the client network 104 (i.e., via the engine 106).

The engine 106 intermediates between the application server 108 and the client nodes 114a, 114b so as to enable the use of multiple technologies, each of which may reside on a separate client node 114a, 114b. In so doing, the engine 106 generates code based on logical requirements, the technology selected by the user, and the appropriate template(s) and manages responses received from the client nodes 114a, 114b. The client nodes 114a, 114b execute the code received from the engine 106 using the one or more compute servers 116a, 116b and manages responses from the compute servers 116a, 116b so as to relay them to the engine 106. Each of the foregoing functions is discussed subsequently in greater detail.

The metadata server 110 stores metadata regarding objects manipulated by the system, including but not limited to objects such as users, groups, servers, authentication, jobs and so on. The metadata server 110 receives queries and updated objects from the application server 108 and the engine 106 and provides responses based on stored metadata. Each of the foregoing functions is discussed subsequently in greater detail.

The authentication server 112 verifies the identity of users and confirms that users are authorized to perform various tasks, such as access the system or utilize particular client nodes 114a, 114b.

System Diagram—Architecture

Figure 2:
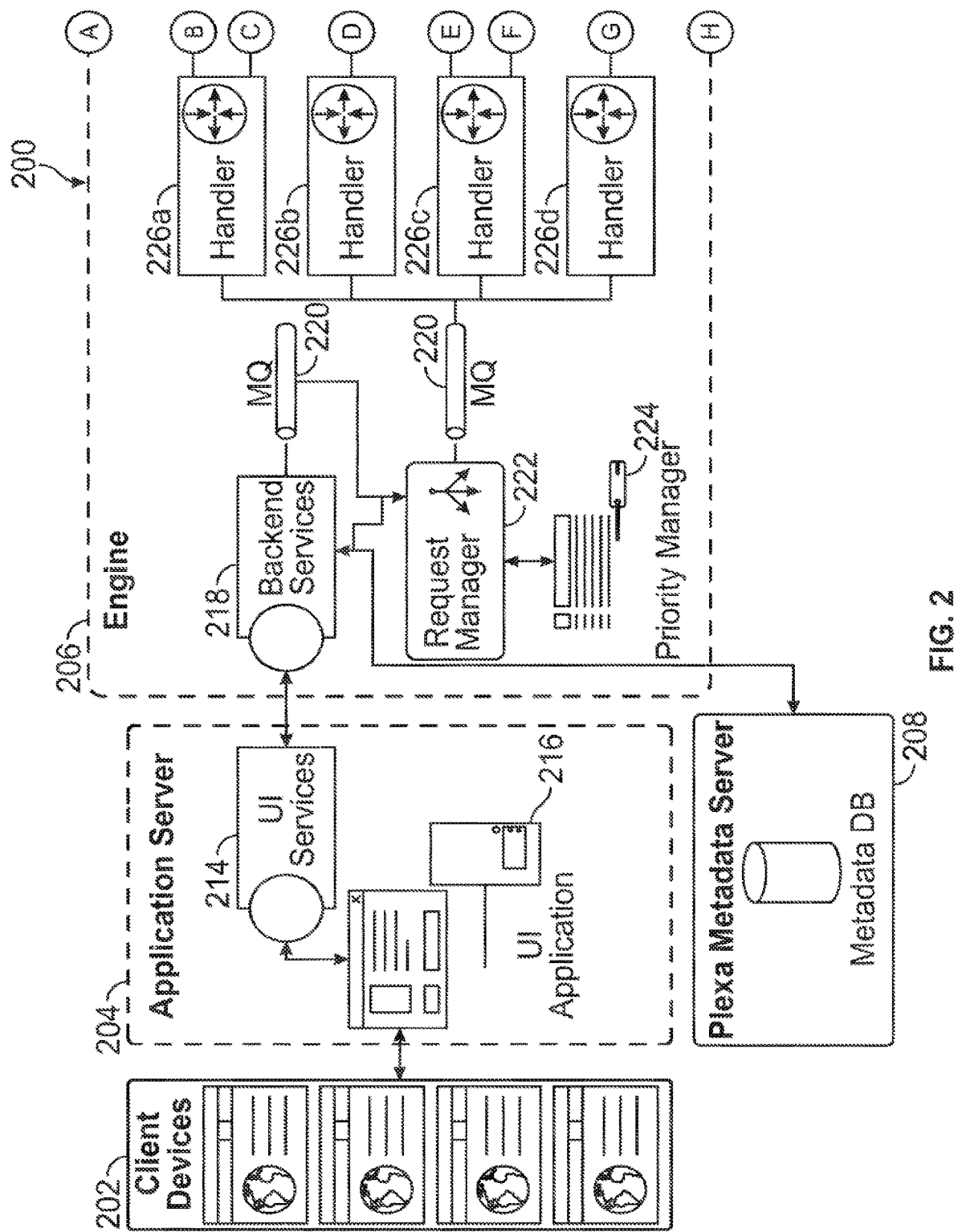
FIG. 2 is an architecture diagram of a system in accordance with an embodiment of the present invention.
Figure 2:
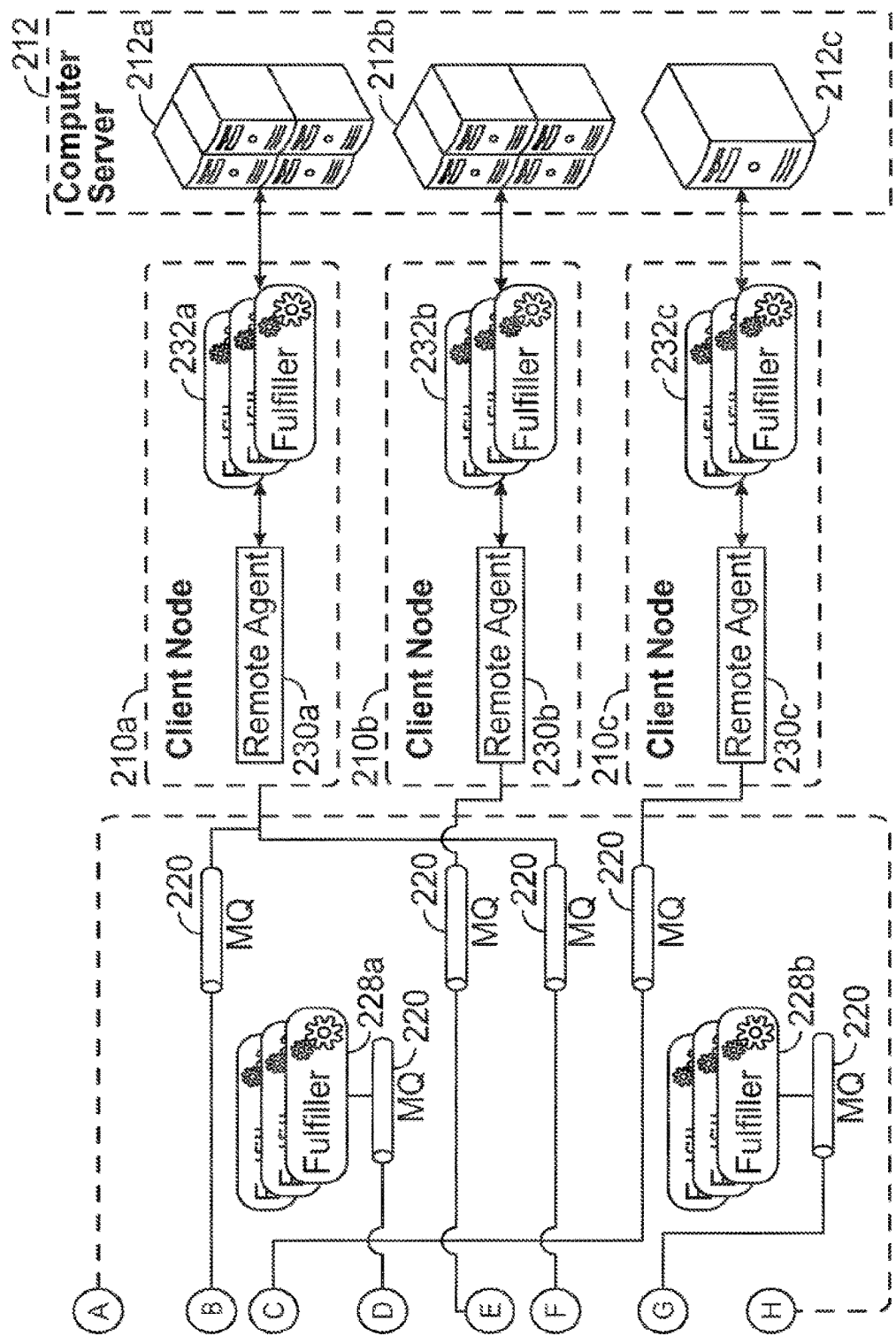

FIG. 2 illustrates the architecture of a system 200 in accordance with an embodiment of the present invention. As shown, one or more client devices 202 are communicatively coupled to the application server 204. The application server 204 renders the GUI for each separate user. In an embodiment, the GUI is rendered as a web application in each user's browser. The application server 204 comprises a user interface (UI) application module 216 which communicates with each client device 202 (both providing the GUI and receiving input) and a UI services module 214 which serves as an intermediary between the UI application module 216 and the other components of the system. In an embodiment, the UI services module 214 interprets requests and commands received from the UI application 216 and relays them to the appropriate module via the engine 206. The UI services module 214 also receives information received from the engine 206 and presents it to the UI application module 216.

Requests sent from the UI services module 214 to the engine 2016 are received by the backend services module 218, which processes the requests and submits them to the request manager 222. In an embodiment, a message queue (MQ) 220 intermediates communications between the backend services module 218 and the request manager 222. Rather than directly calling the request manager 222, the backend services module 218 can transmit data in a message which is placed in storage in the MQ 220 until the request manager 222 is ready to access it. This permits the backend services module 218 and the request manager 222 to run independently (i.e., at different speeds, at different times, and in different locations—including on different computing devices), as multiple requests may be queued up and accessed by the request manager 222 when it is available.

The code handlers 226a, 226b, 226c, 226d process requests by formatting them correctly and relaying them to either a fulfiller 228a, 228b or a client node 210a, 210b, 210c for processing. Code handlers 226 can function in three different roles: code generation handlers (such as handlers 226b, 226d) which assist in generating new code; code execution handlers (such as handlers 226a, 226c) which manage the execution of existing code by a compute server 212; or code migration handlers (such as handlers 226b, 226d using different fulfillers) which migrate code from one target platform to another target platform. For example, a handler 226b may receive a request that can be processed by a code execution fulfiller 228a. The handler 226b will format the request to the desired properties and include source code to be executed by the fulfiller 228a and relay the properly formatted request via a MQ 220. Another request may be received by handler 226a which is to be processed by client node 210a. After processing the request, the handler 226a will relay it to the client node 210a via a MQ 220.

The request manager 222 determines which handler 226 should process each request based on input from the priority manager 224. Once the correct handler 226 is determined, the request manager 222 places the request into a MQ 220 for retrieval. The priority manager 224 tracks the availability of the handlers 226. If a given request cannot be fulfilled immediately (i.e., because the necessary resource is not available), the request manager 224 holds the request back for a configurable time period. Alternatively, if the necessary resource is available to handle the request, a code execution request is sent to the respective handler 226 for processing.

For each client node 210, a respective remote agent 230 takes request info from the MQ 220 as the client node 210 becomes available and initiates the appropriate client node 210. The remote agent 230 further updates the MQ 220 to indicate that the request is being processed. For example, when client node 210b becomes available, remote agent 230b will take a request from the MQ 220 and relay it to the appropriate one of a plurality of associated fulfillers 232b before sending a message to the MQ 220 indicating that the request is in process. Each fulfiller sends a response to the queue. Each fulfiller 232 may perform processing locally (such as, for example, code generation) before coordinating with a separate compute server 212 to finish processing the request, if necessary. Once processing is complete, the results are relayed through the engine 206 to the application server 204 via the UI services module 214, where the UI application 216 processes the results and presents them to the respective client device 202 in the GUI.

Code Generation

Figure 3:
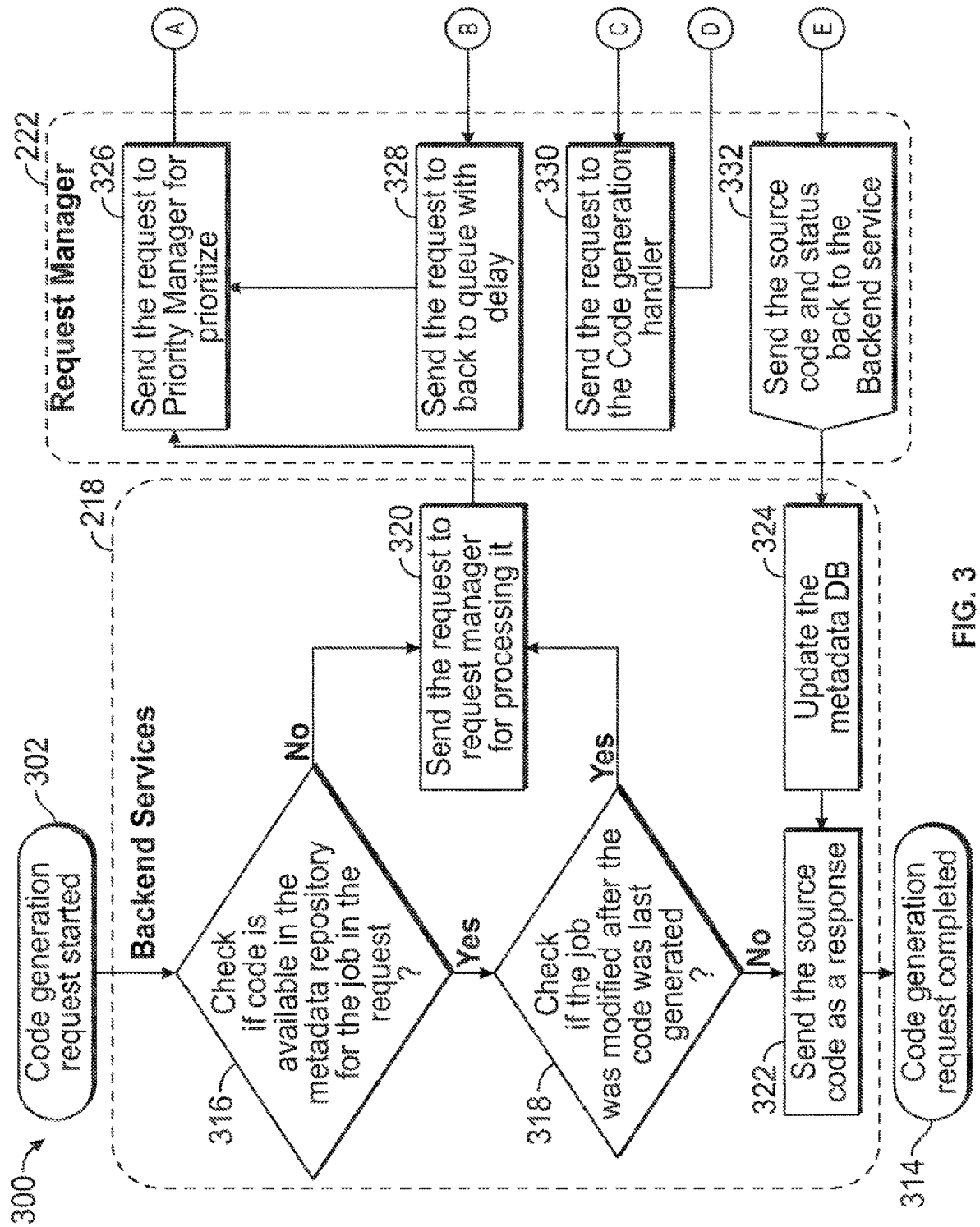
FIG. 3 is a flow chart illustrating the steps of code generation, in accordance with an embodiment of the claimed invention.
Figure 3:
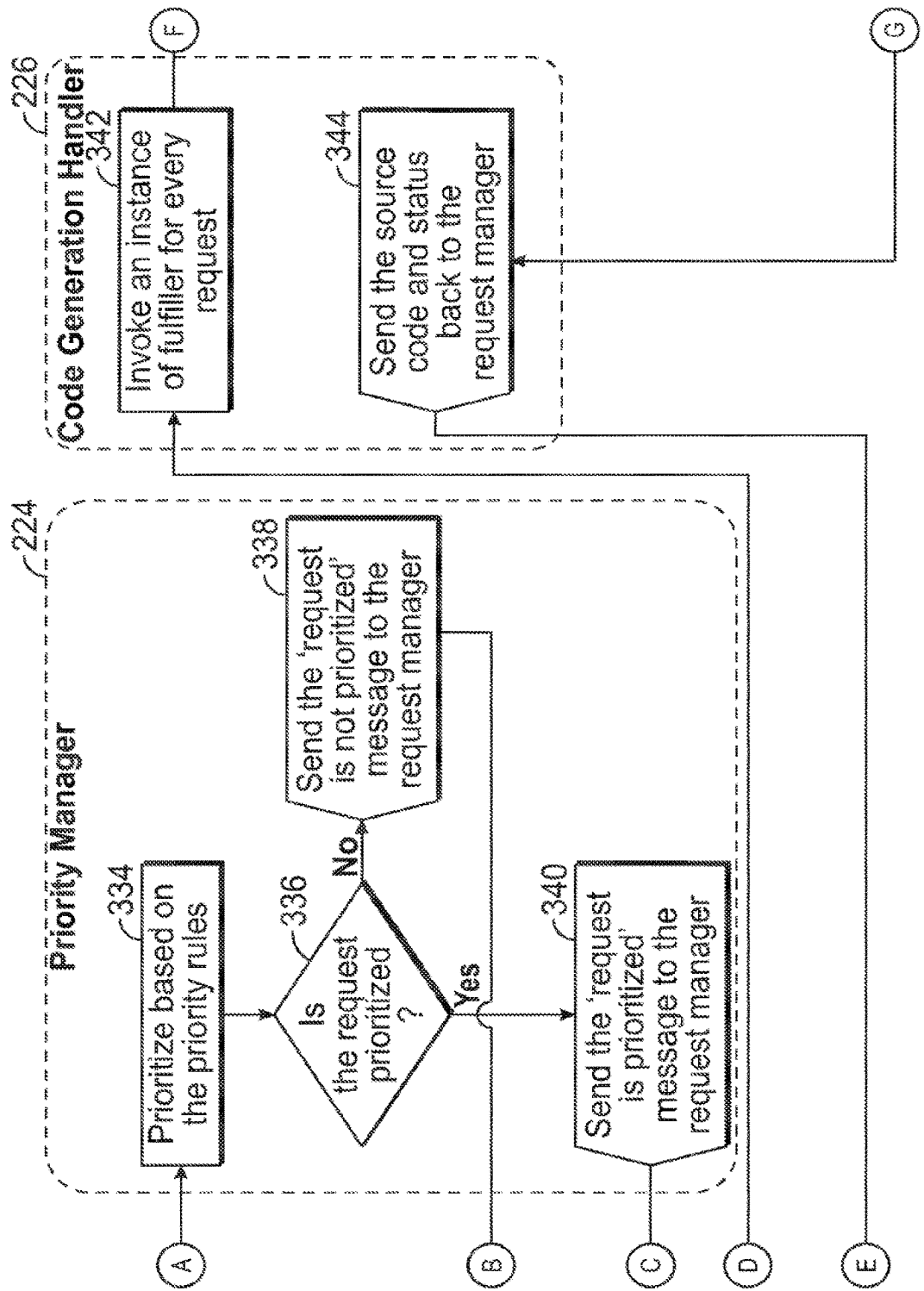
Figure 3:
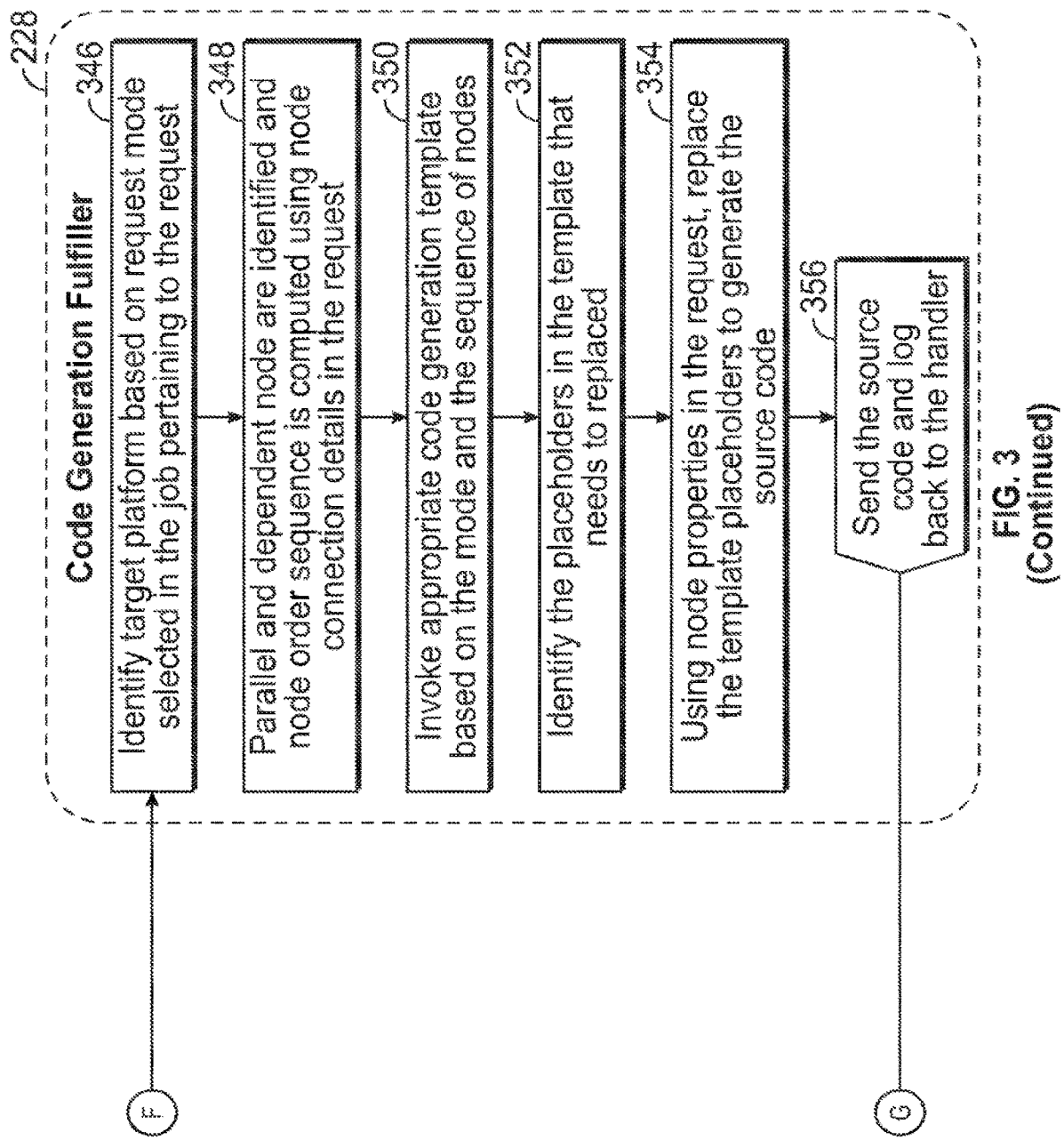

FIG. 3 illustrates the process flow of performing a code generation request. In a code generation request, a user desires that executable code be created to perform a particular task using a given technology. For example, a user may desire that two data files be appended together. Multiple elements of the system must interact to perform the request, including the backend services module 218, the request manager 222, the priority manager 224, the code generation handler 226, and the code generation fulfiller 228.

The method 300 begins by initiating a request to generate code 302. For example, a user may provides a command using a client device 202 through the GUI to combine two data sets. The request is relayed to the backend services module 218, and the request is formatted. In an embodiment, the request is formatted using JavaScript Object Notation (JSON) and contains the request details, the requestor details, the job details and the node details. In the example of appending two data sets, the request details may identify the specific request, the requestor details identify the user who initiated the request, the job details describe the task to be performed, and the node details provide information regarding the data set which needs to be appended. Once the request is formatted, the backend services module 218 validates the information contained in the request. First, the backend services module 218 checks whether the user has sufficient access to have the request processed; if the user does not, a suitable notification is returned to the client device 202.

If the user has sufficient access, the method proceeds to step 316 where the backend services module 218 checks whether the executable code necessary to perform the request already exists in the repository on the metadata server 110. For example, if the user has previously created a predefined job and has requested that the job be rerun on a new data set, the necessary code will have been previously generated and can be retrieved from the metadata server 110.

If code is available, the method proceeds to step 318 and the backend services module 218 checks if the job to which the retrieved code relates has been updated since the code was generated. For example, if the user has modified the parameters of the job since the last time it was run, the code will no longer be up-to-date and will need to be regenerated. However, if the job has not been updated, the retrieved executable code is sufficient to complete the request. The method proceeds to step 322, and the backend services module 218 returns the retrieved executable code as a response to the request, concluding the method at step 314 as the retrieved code is presented to the user via the client device 202.

In the event that either code is not available from the repository on the metadata server 110 or if the job has been updated since the code was generated, the method proceeds instead to step 320 whereat the request is sent to the request manager 222 for processing.

After retrieving a request from the MC 220, at step 326 the request manager 222 sends the request to the priority manger 224 so that the priority manger 224 can prioritize the request. At step 334, the request is prioritized based on the priority rules stored in the priority manager 224. If the priority manger 224 determines at step 336 that the request is not prioritized (i.e., should not be processed for some period of time), the priority manger 224 informs the request manager 222 and the request is sent back to the MQ 220 at step 329, where it will remain for a predetermined time before being returned to the priority manager 224 at step 326. Once the priority manager 224 determines at step 336 that the request is prioritized (i.e., should be processed without delay), the method proceeds to step 340 wherein the priority manager 224 notifies the request manager 222 that the request should be processed.

Once the request manager 222 is informed that a request should be processed, the method continues with step 330 whereby the request is sent to a code generation handler 226, such as handler 226*b*. In an embodiment (which is not shown), the request manager 222 confirms the particular handler 226*b* to be used is available prior to forwarding the request. If the handler 226*b* is unavailable, the request is held back for a predetermined period before being returned to the MQ 220 and routed back through the queue for the request handler 222 (i.e., the request will be routed back to step 326 and repeat the checks by the priority manager 224 at steps 334 and 336). Alternatively, as in the embodiment shown in FIG. 3, the request handler 222 forwards the request to a MQ 220 and the handler 226*b* accesses the request as soon as the handler 226*b* is available.

Upon receiving the request at step 342 from the MQ 220, the code generation handler 226*b* determines which code execution fulfiller 228 is needed to complete the request and invokes the needed fulfiller 228, such as one of the plurality of fulfillers 228*a*. In an embodiment, the handler 226*b* checks that the needed fulfiller 228*a* is available and delays the request as needed. Alternatively, as in the embodiment shown in FIG. 3, the fulfiller 226*b* sends the request to a MQ 220 and the fulfiller 228*a* accesses the request once it has availability to process the request.

Once the fulfiller 228*a* receives the request, the method proceeds to step 346 whereby the fulfiller 228*a* identifies the target platform based on the mode information stored in the request. At step 348, the fulfiller 228*a* identifies parallel and dependent nodes and computes a node order sequence to be used in carrying out the request. At step 350, the fulfiller 228*a* invokes the necessary code generation template(s) for the target platform. Each template contains executable code that will run on the target platform as well as placeholders for dynamic values. At step 352, the fulfiller 228*a* identifies any placeholders for dynamic values that need to be updated, and at step 354 the placeholders are replaced with values based on the request to create fully executable code that will run on the target platform. The generated source code is then sent back to the handler 226 at step 356, along with a log file which provides a record of the steps performed by the fulfiller 228*a* as well as any errors the fulfiller 228*a* encountered.

As an example, for a request to append one data file to another, the fulfiller 228*a* will create a job with the following nodes: delimited file reader; table reader; append; and delimited file writer. Each of these nodes is a separate operation that will be performed. The nodes for reading and writing files are also connected to nodes for the data objects to be read and written to, respectively. In this example, the fulfiller 228*a* accesses the following templates in order: delimitedfilereader; tablereader; append; and delimitedfilewriter. These templates are created in advance and each corresponds to an operation that may be performed using the target platform. For each template, the fulfiller 228*a* extracts information from the node properties provided in the request and generates appropriate source code (i.e., by filling in any placeholders for dynamic values). Once the source code for each node is generated, the fulfiller 228*a* merges the source code together so as to perform the nodes in the correct order and returns the generated code to the handler 226.

Upon receiving the generated source code at step 344, the handler 226*b* returns the source code and the status of the request back to the request manager 222, which returns both to the backend service module 218 at step 332. At step 324, The backend service module 218 updates the repository on the metadata server 110 to contain the newly generated code. At step 322, the backend service module 218 sends the code to the client device 202 via the UI services module 214 and the UI application 216, where it is displayed to the user and the method completes.

Code Execution

Figure 4:
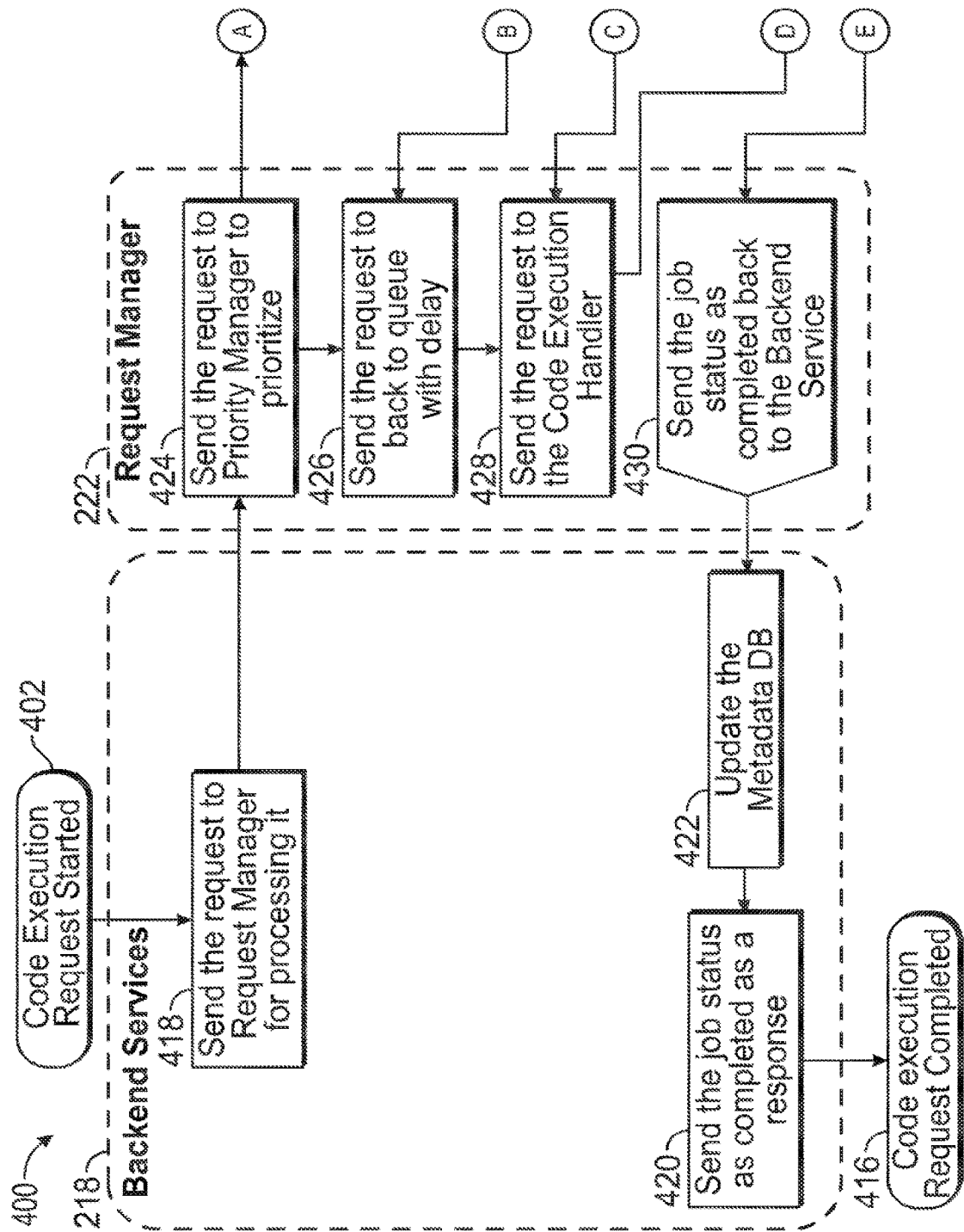
FIG. 4 is a flow chart illustrating the steps of code execution, in accordance with an embodiment of the claimed invention.
Figure 4:
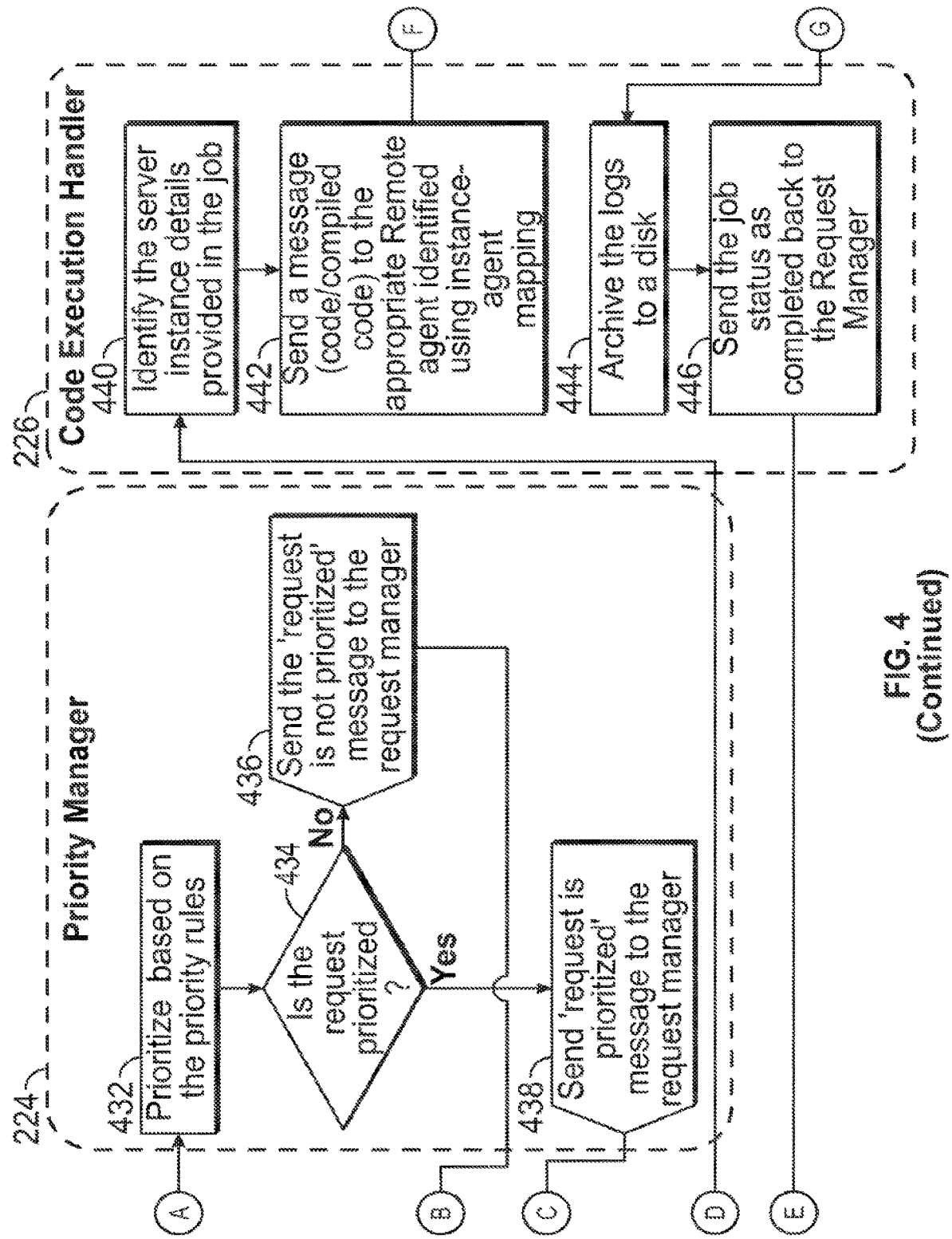
Figure 4:
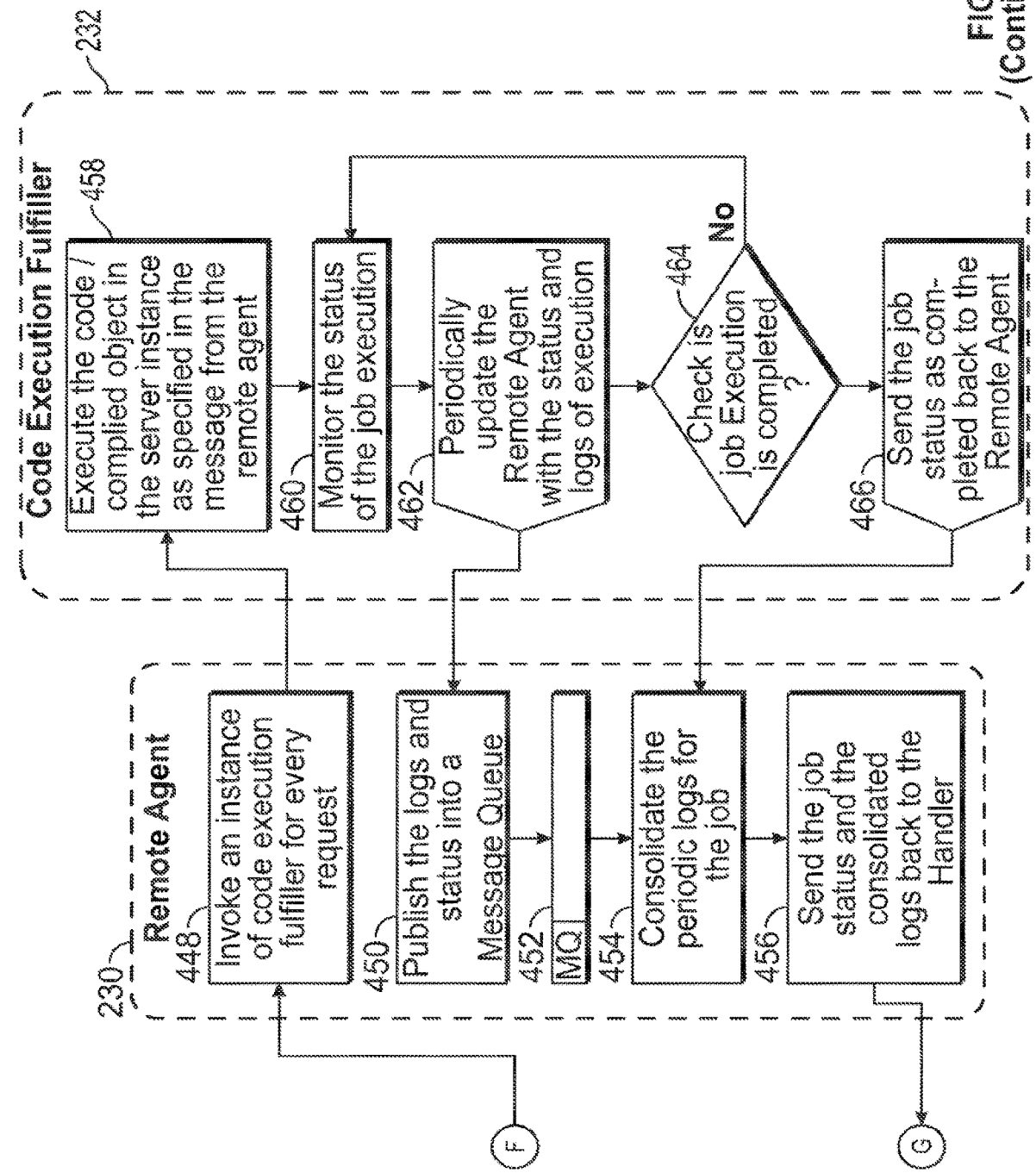

FIG. 4 illustrates the process flow of performing a code execution request. A user initiates a code execution request when the user desires that executable code that has been previously generated be executed by a target platform (i.e., causing the target platform to carry out a particular task, such as a performing data analytics processing). Multiple elements of the system must interact to perform the request, including the backend services module 218, the request manager 222, the priority manager 224, a code execution handler 226*b*, 226*c*, a remote agent 230, and a code execution fulfiller 232.

The method 400 begins at step 402 by initiating a request to execute code 402. The request is relayed from the client device 202 to the backend services module 218. The backend services module 218 validates the information contained in the request. For example, the backend services module 218 checks whether the user has sufficient access to have the request processed; if the user does not, a suitable notification is returned to the client device 202 and the method does not proceed until an authorized user initiates a request (e.g., until the user provides acceptable credentials).

If the user has sufficient access, the method proceeds to step 418 where the backend services module 218 sends the request to the request manager 222 for processing via a MC 220.

After retrieving a request from the MC 220, at step 424 the request manager 222 sends the request to the priority manger 224 so that the priority manger 224 can prioritize the request. At step 432, the request is prioritized based on the priority rules stored in the priority manager 224. If the priority manger 224 determines at step 434 that the request is not prioritized (i.e., should not be processed for some period of time), the priority manger 224 informs the request manager 222 and the request is sent back to the MQ 220 associated with the request manager 222 at step 426, where it will remain for a predetermined time before being returned to the priority manager 224 at step 436. Once the priority manager 224 determines at step 434 that the request is prioritized (i.e., should be processed without delay), the method proceeds to step 438 wherein the priority manager 224 notifies the request manager 222 that the request should now be processed.

Once the priority manager 224 notifies the request manager 222 that a request should be processed, the method continues at step 428 where the request is sent to a code execution handler 226, such as handler 226a. In an embodiment (which is not shown), the request manager 222 confirms the particular handler 226a to be used is available prior to forwarding the request. If the handler 226a is unavailable, the request is held back for a predetermined period before being returned to the MQ 220 and routed back through the queue for the request handler 222. Alternatively, as in the embodiment shown in FIG. 4, the request handler 222 forwards the request to a MQ 220 and the handler 226a accesses the request as soon as the handler 226a is available.

Upon receiving the request at step 440 from the MQ 220, the code execution handler 226a determines which code execution fulfiller 232 and compute server 212 is needed to complete the request. At step 442, the code execution handler 226a retrieves the necessary source code from the repository on the metadata server 110, attaches it to the request, and sends the request to the remote agent 230 corresponding to the desired fulfiller 232 and compute server 212. Once the remote agent 230a receives the request, the method proceeds to step 448 whereby the remote agent 230a invokes the fulfiller 232a needed to execute the code contained in the request. The remote agent 230a passes the request to the fulfiller 232a, which executes the code contained in the request at step 458 by passing it to the compute server 212 for processing. At step 460, the fulfiller 232a monitors the execution of the code by the compute server and periodically updates the remote agent 230a regarding the progress of the processing at step 462 while checking to confirm whether the execution is complete at step 464. If it is not, the remote agent 230a continues monitoring the status of the compute server 212 and the method returns to step 460. Upon receiving a status update, at step 450 the remote agent logs the status updates to a message queue 452. These status updates contain execution logs, progress updates, and preview data, each of which may be relayed to the user via the client device 202 during execution so that the user may remain appraised of the progress.

Once the code execution fulfiller 232a confirms that execution is complete at step 464, it sends the completed job information to the remote agent at step 466. At step 454, the remote agent consolidates all of the status updates received during processing as well as the completed job information and returns it to the code execution handler 226a. At step 444, the code execution handler 226a archives the logs and returns the completed request information to the request manager 222, which forwards the completed request to the backend services module 218 at step 430.

Upon receiving a completed request, at step 422 the backend services module updates a repository on the metadata server 110 with the details of the completed request, and informs the user via the client device 202 that the job is complete at step 420. At step 416, the method ends and the completed results are displayed to the user at the client device 202 via the UI services module 214 and the UI application 216, where it is displayed to the user and the method completes.

Code Migration

Figure 5:
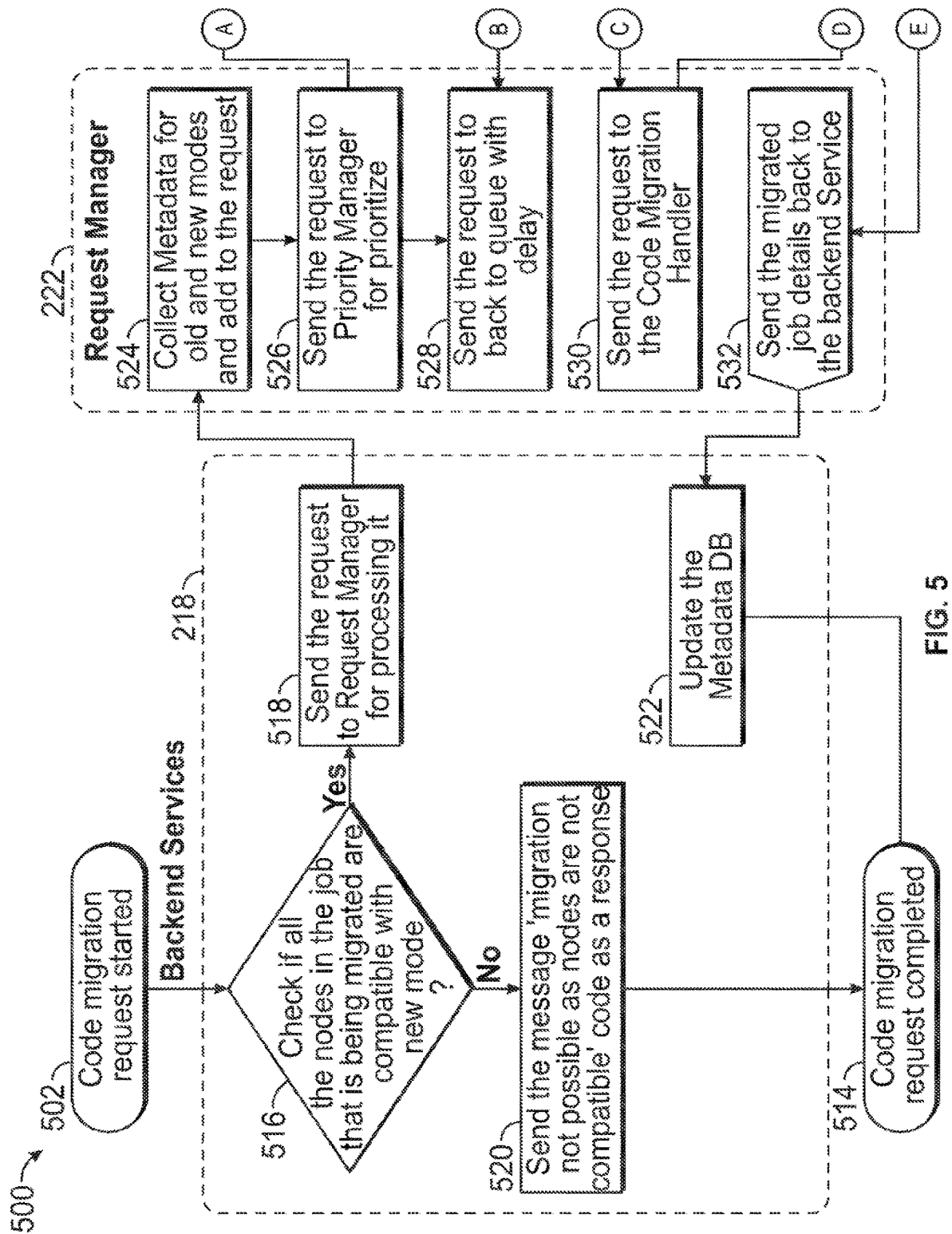
FIG. 5 is a flow chart illustrating the steps of code migration, in accordance with an embodiment of the claimed invention.
Figure 5:
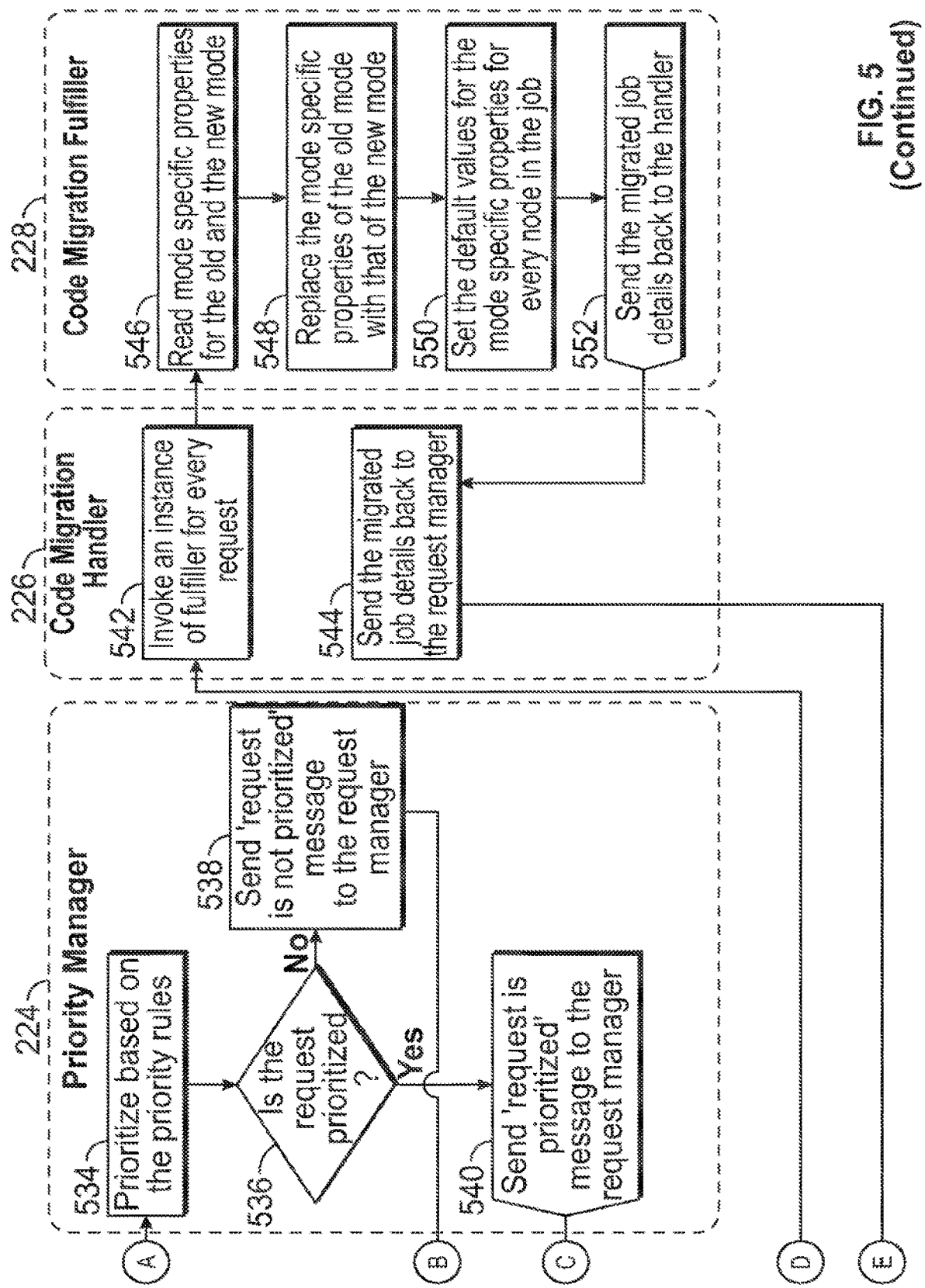

FIG. 5 illustrates the process flow of performing a code migration request. In a code migration request, a user desires that executable code that has been previously generated for one target platform be recreated so as to run on a different target platform. Multiple elements of the system must interact to perform the request, including the backend services module 218, the request manager 222, the priority manager 224, a code migration handler 226a, 226d, and a code migration fulfiller 228a, 228b.

The method 500 begins at step 502 by initiating a request to migrate code. The request is relayed from the client device 202 to the backend services module 218. The backend services module 218 validates the information contained in the request and formats the request correctly. In an embodiment, the request is formatting using JSON and contains the request details (i.e., the current target platform for which the existing code was prepared and the new target platform to which the code must be migrated), the requestor details, the job details, the node details, and existing metadata for both target platforms. Once the request is formatted, the backend services module 218 validates the information contained in the request. First, the backend services module 218 checks whether the user has sufficient access to have the request processed; if the user does not, a suitable notification is returned to the client device 202. If the user has sufficient access, the method proceeds to step 516 where the backend services module 218 checks whether the nodes contained in the existing code (i.e., the various actions or steps that the code carries out, which may be platform specific) are compatible with the new target platform (i.e., whether the new target platform is capable of carrying out all of the steps in the existing code). At step 520, if the new target platform is not capable of executing all of the nodes in the existing code, the backend services module 218 returns a message indicating that migration is not possible, which is relayed to the user via the client device 202 and the method ends at step 514. If the nodes are compatible with the new target platform, the method proceeds to step 518 and the request is sent to the request manager 222 for processing via a MC 220.

After retrieving a request from the MC 220, at step 524 the request manager 222 sends the request to the priority manger 224 so that the priority manger 224 can prioritize the request. At step 534, the request is prioritized based on the priority rules stored in the priority manager 224. If the priority manger 224 determines at step 536 that the request is not prioritized (i.e., should not be processed for some period of time), the priority manger 224 informs the request manager 222 and the request is sent back to the MQ 220 associated with the request manager 222 at step 528, where it will remain for a predetermined time before being returned to the priority manager 224 at step 526. Once the priority manager 224 determines at step 536 that the request is prioritized (i.e., should be processed without delay), the method proceeds to step 540 wherein the priority manager 224 notifies the request manager 222 that the request should now be processed.

Once the priority manager 224 notifies the request manager 222 that a request should be processed, the method continues at step 530 where the request is sent to a code migration handler 226, such as handler 226d. In an embodiment (which is not shown), the request manager 222 confirms the particular handler 226d to be used is available prior to forwarding the request. If the handler 226d is unavailable, the request is held back for a predetermined period before being returned to the MQ 220 and routed back through the queue for the request handler 222. Alternatively, as in the embodiment shown in FIG. 5, the request handler 222 forwards the request to a MQ 220 and the handler 226d accesses the request as soon as the handler 226d is available.

Upon receiving the request at step 542 from the MQ 220, the code migration handler 226d determines which of a plurality of code migration fulfillers 228d is needed to complete the request. At step 542, the code execution handler 226d invokes the fulfiller 228b needed to migrate the code contained in accordance with the request and passes the request to the fulfiller 228b. At step 546, the code migration fulfiller 228b extract the mode (or platform) specific properties from the request for both the old mode (i.e., the platform on which the code is currently configured to run) and the new mode (i.e., the platform to which the code is being migrated). As discussed above, in an embodiment, the formatted request contains the following information in JSON format: the request mode and properties, detailed node properties for the existing code, data object details (i.e., for those objects with which the code interacts); node connection details (i.e., how the steps performed by the code are linked and ordered); and metadata for both the source and target mode. At step 548, the fulfiller 228b replaces the mode specific properties of the old mode with those of the new mode. For example, if a function call in the old mode is "readData" and the corresponding function call for the new mode is "read_data," the old function call is replaced with the new function call. At step 550, any necessary variables or default values are updated in accordance with the requirements of the new mode (or target platform). At step 552, the fulfiller 228b finishes processing and returns the completed request with the newly migrated code to the handler 226d, which relays it to the request manager at step 544.

Upon receiving a completed request, at step 532 the request handler passes the migrated job details to the backend services module 218. The backend services module 218 updates the repository in the metadata server 110 so that the newly migrated code will be available for future jobs and the method completes at step 514 when the competed job status is displayed to the user at the client device 202 via the UI services module 214 and the UI application 216.

Business Rules

Figure 6:
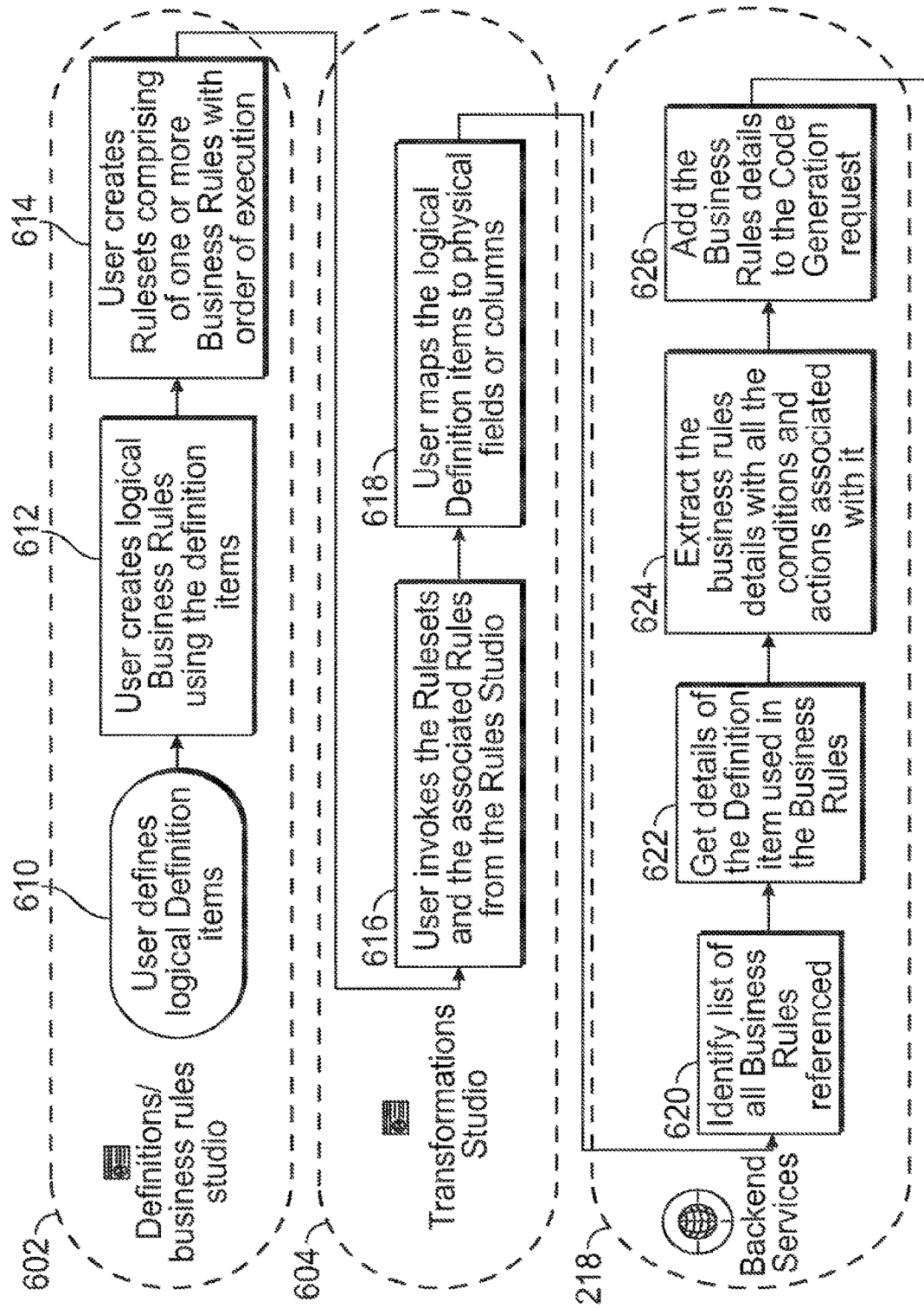
FIG. 6 is a flow chart illustrating the steps of creating and applying business rules, in accordance with an embodiment of the claimed invention.
Figure 6:
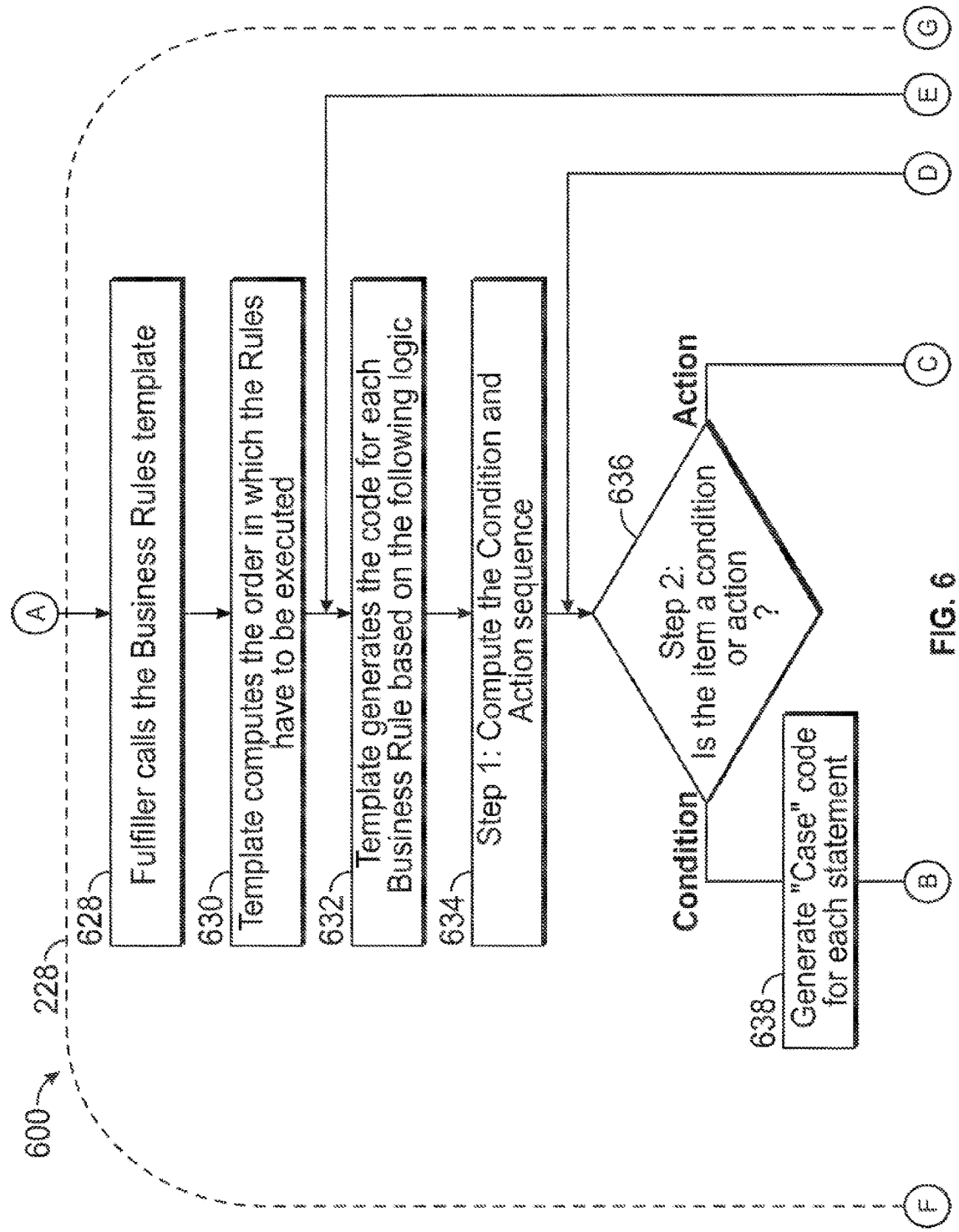
Figure 6:
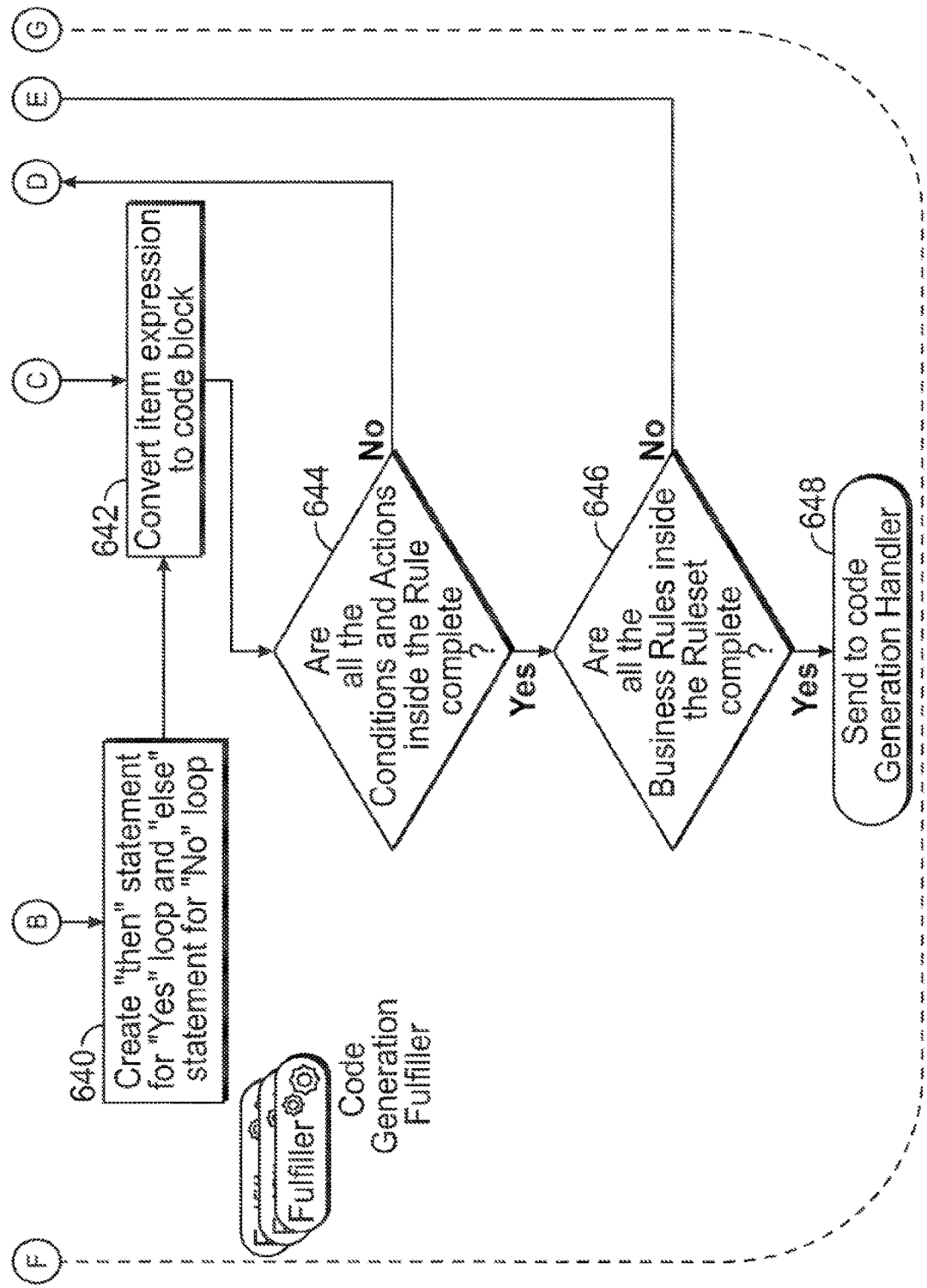

FIG. 6 illustrates the process flow of performing creating new business rules by a user. Business rules are logically defined rules that determine how data should be manipulated so as to perform a desired operation, such as performing data analytics. By design, business rules are created in a logical format that is platform agnostic, so as to permit the user to perform operations on any platform compatible with the system without having to write or understand the platform specific source code.

The method 600 begins at step 610 as the user interacts with a definitions/business rules module 602 via the client device 202. The definitions/business rules module 602 is a GUI that contains all of the tools a user requires to provide the needed input to create a new business rule. At step 610, the user defines logical definition items using the GUI. At step 612, the user employs the logical definition items to create logical business rules. At step 614, the user creates one or more rule sets, each comprising one or more business rules and, for rule sets containing at least two business rules, the order in which the business rules should be performed.

At step 616, the GUI presents the user with a transformations module 604 (through which the user manipulates the created rule sets and ties them to particular data by formatting variables in the rule sets based on the desired data). At step 618, the user maps variables in the rule set which correspond to various logical definitions to fields in the data to be processed. For example, the user may create a rule set for analyzing the rent charged at various properties. At step 618, the user will map the variable corresponding to the amount of rent charged to the particular column heading or field in the data which lists rent. This permits one logical rule set to be used to process data in a wide variety of formats without the need for the user to do more than map the necessary variables.

Once the user finishes mapping all variables in the rule set, the method proceeds to step 620 and the engine 206 begins processing (i.e., to generate the code to carry out the actions specified in the newly created logical rule set). The backend services module 218 first identifies a list of all business rules referenced in the rule set. At step 622, the backend services module 218 collects the details of the definition items used in the business rules contained in the rule set. At step 624, the backend services module 218 extracts the business rules details, including all of the associated conditions and actions for each business rule. At step 626, the backend services module 218 creates a code generation request containing all of the business rules details and passes the request to the code generation fulfiller 228a via a handler 226a.

Code is then generated in accordance with the method described above with reference to FIG. 3. Specifically, after being invoked, the code generation fulfiller 228a invokes a business rules template at step 628 and computes the order in which the rules must be executed at step 630. At step 632, the template is used to generate code for each business rule by repeating the following steps for each rule. First, the fulfiller 228a computes the condition and action sequence at step 634. Next, it checks if the item is a condition or action at step 636 and if it is a condition, generates "case" code at step 638 for each statement and creates alternative/loop statements (i.e., a "then" statement for each "yes" loop and an "else" statement for each "no" loop) at step 640. At step 640, each action and properly processed condition is converted from an item expression to a code block. Once all conditions and actions within a rule are complete at step 644 and all of the business rules within the rule set are complete at step 646, the code is returned to the code generation handler 226a and the method completes.

Data Quality

Figure 7:
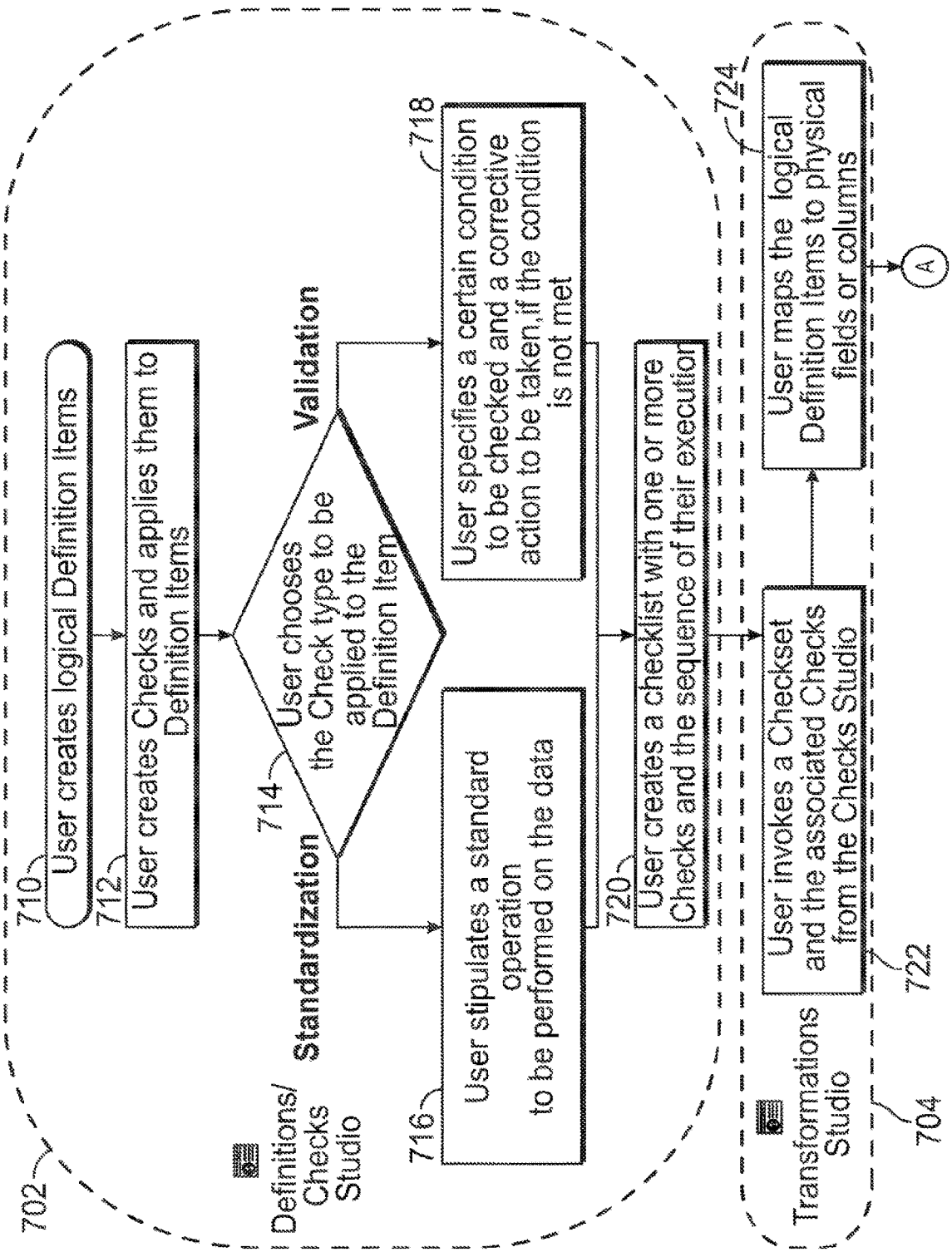
FIG. 7 is a flow chart illustrating the steps of creating and performing a data quality check, in accordance with an embodiment of the claimed invention.
Figure 7:
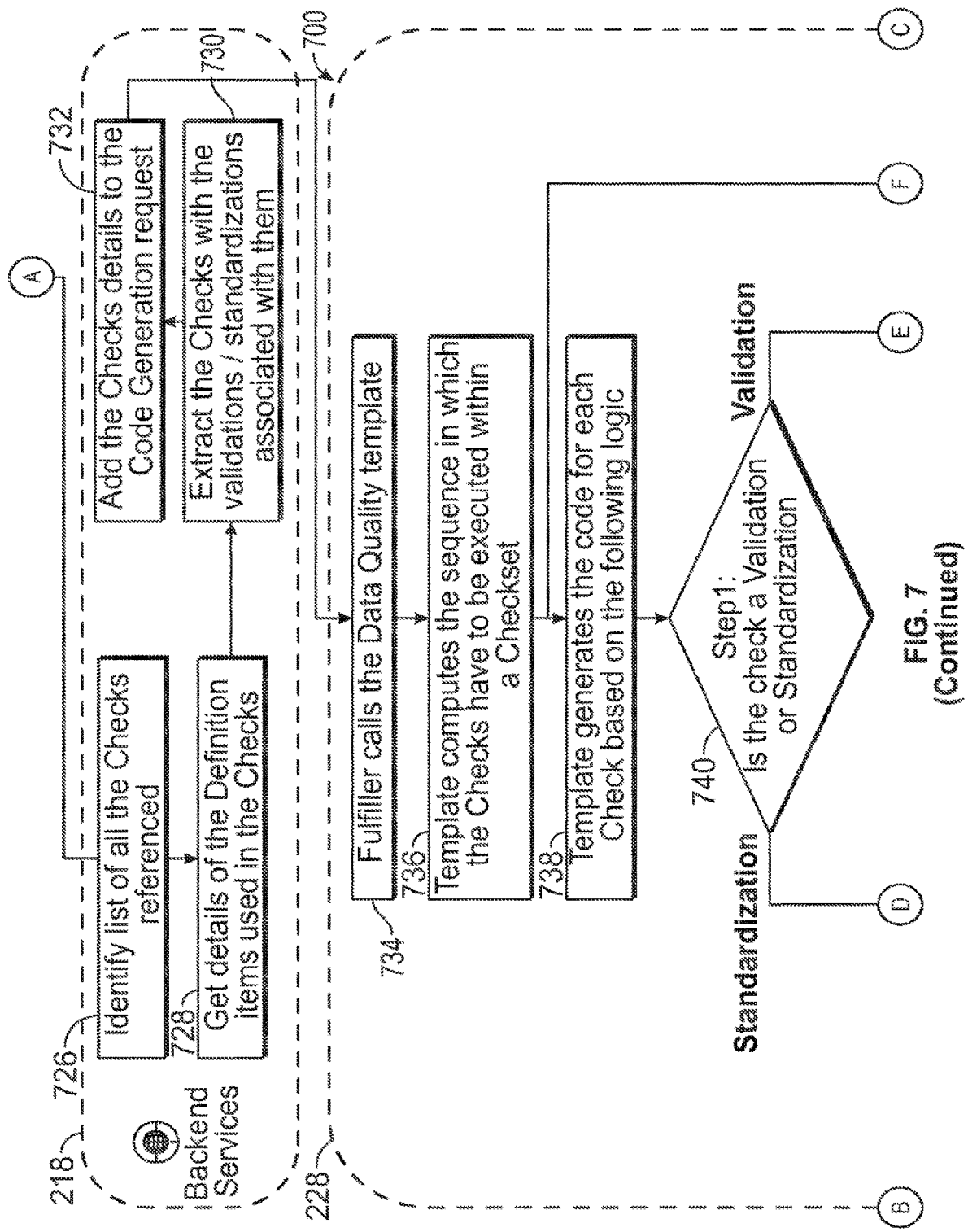

FIG. 7 illustrates the process flow of creating new definitions or checks a user so as to confirm data quality.

The method 700 begins at step 710 as the user interacts with a definitions/checks module 702 via the client device 202. The definitions/checks module 702 is a GUI that contains all of the tools a user requires to provide the needed input to create check data quality. At step 710, the user creates logical definition items before creating checks at step 712 and applying them to the logical definition items created in step 710. At step 714, the user chooses the type of check to perform (i.e., to apply to the definition item): either a standard operation, as shown in step 716, or a certain condition to be checked and an associated action to be taken if the condition is not met (i.e., in the form of an if, then statement) as shown at step 718. At step 720, the user creates a check list with one or more checks and, for check lists containing at least two checks, the order in which the checks should be performed.

At step 722, the GUI presents the user with a transformations module 704 (through which the user manipulates the created check lists and ties them to particular data by formatting variables in the check lists based on the desired data). The transformation module 704 is generally similar to transformation module 604, but is formatted for interacting with check lists rather than rule sets. At step 724, the user maps variables in the check list which correspond to various logical definitions to fields in the data to be checked. For example, the user may create a check list for confirming that the rent charged at various properties is all positive (i.e., that the data has not been corrupted with negative values in the rent field). At step 724, the user will map the variable corresponding to the amount of rent charged to the particular column heading or field in the data which lists rent. This permits one logical check list to be used to validate data in a wide variety of formats without the need for the user to do more than map the necessary variables.

Once the user finishes mapping all variables in the check list, the method proceeds to step 726 and the engine 206 begins processing (i.e., to generate the code to carry out the actions specified in the newly created logical check list). The backend services module 218 first identifies a list of all checks referenced in the check list. At step 728, the backend services module 218 collects the details of the definition items used in the checks contained in the check list. At step 728, the backend services module 218 extracts the check details, including all of the associated conditions and actions for each check. At step 730, the backend services module 218 extracts the checks with validations or standardizations associated with them, and at step 732 it creates a code generation request containing all of the check details and passes the request to the code generation fulfiller 228a via a handler 226a.

Code is then generated in accordance with the method described above with reference to FIG. 3. Specifically, after being invoked, the code generation fulfiller 228a invokes a data quality template at step 734 and computes the order in which the rules must be executed at step 736. At step 738, the template is used to generate code for each check by repeating the following steps for each. First, at step 740, the fulfiller 228a determines whether a given check is a validation check or a standardization check. If the check is a standardization check, the standardization operation is performed on the specified data at step 742. Otherwise, if the check is a validation check, at step 744 the fulfiller 228a confirms whether the values pass the validation specification. Values which pass are ignored, as shown at step 746, while values which fail are corrected at step 748 based on the corrective action specified by the user. At step 750, the fulfiller 228a collects statistics including the data acted on (such as column names), the operations performed, and the results of the various checks. Once all checks are completed at step 752, the method completes and the results are returned to the code generation handler 226a.

Job Creation and Execution

With reference to FIGS. 8-28, the following provides an illustrative example of the input provided by, and the information provided to, a user while creating and executing jobs using a system in accordance with the present invention. FIGS. 8-28 are illustrative screen shots of a GUI provided to the user via the client device 202.

Figure 8:
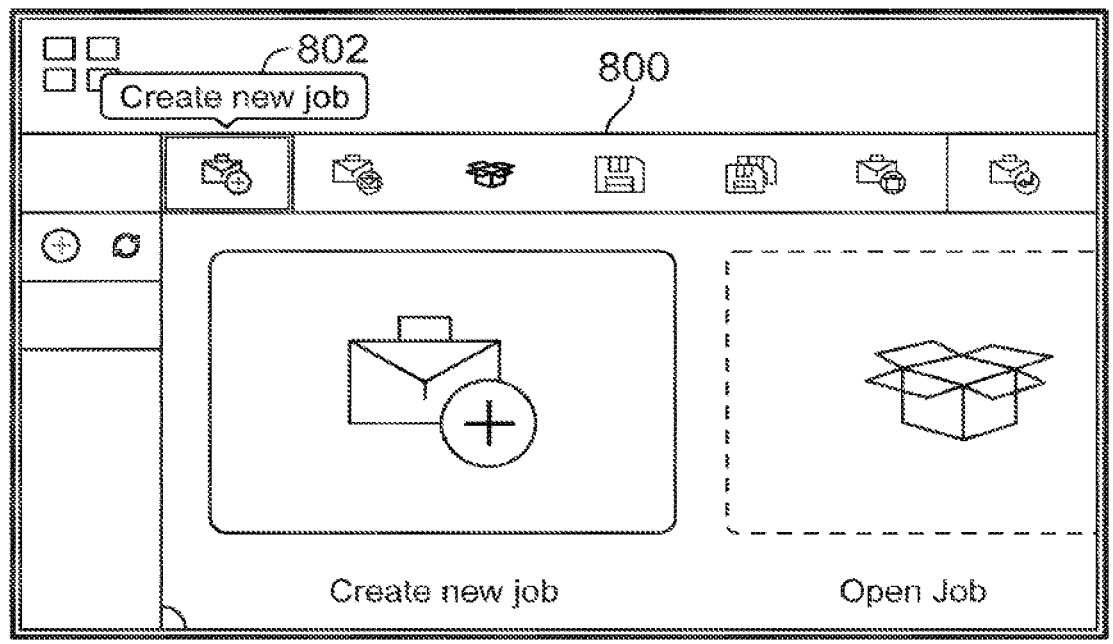
Figure 9:
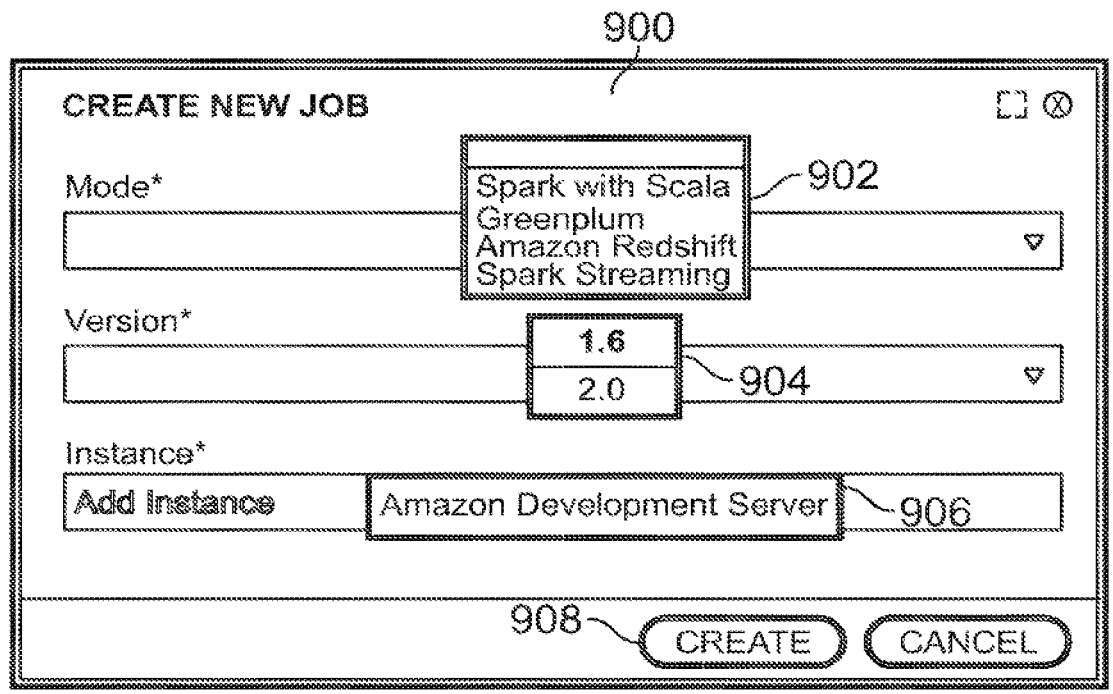

As shown in FIG. 8, the GUI presents the user with numerous options 800 for interacting with the system 800, including the option to create a new job 802. Once the user selects the option to create a new job 802, as shown in FIG. 9, the GUI displays a specialized menu 900 through which the user provides the information necessary to create the job, including the mode 902 (i.e., Spark with Scala), the version 904 of the target software to use, and the instance 906 (i.e., Amazon Development Server) on which the job will be stored. If available, the user may select more than one instance. When finished, the user selects create 908.

Figure 10:
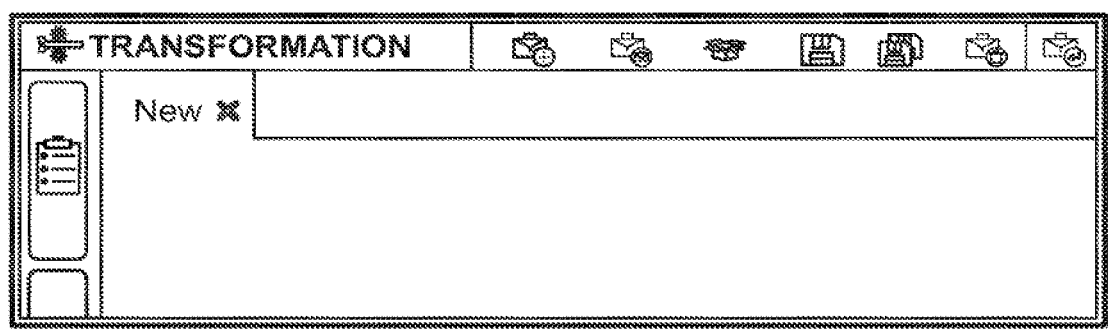
Figure 11:
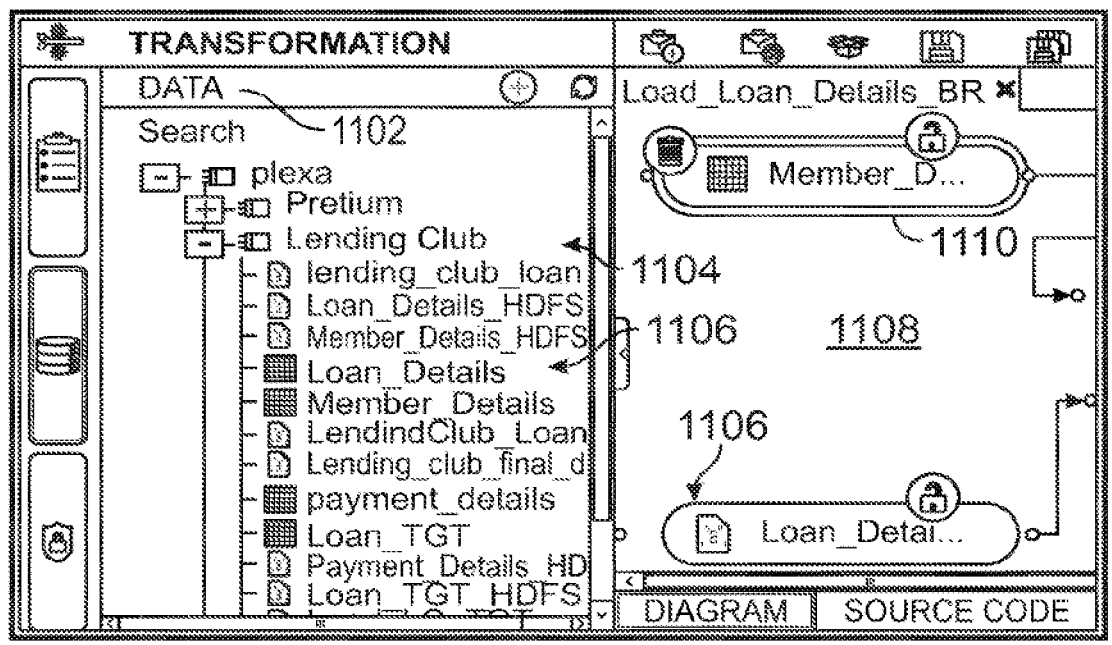

As shown in FIG. 10, the user is then presented with the transformation menu 1000, whereby the user can add or delete data objects from a job. As shown in FIG. 11, to add or delete data objects, a user first selects the data pane 1102, then selects a source 1104 (i.e., Lending Club) and an object 1106 (i.e., Member Details). By dragging the selected object 1106 onto the job canvas 1108, the object 1106 is added to the job. To delete an object, the user simply selects the delete icon 1110 for a particular object.

Figure 12:
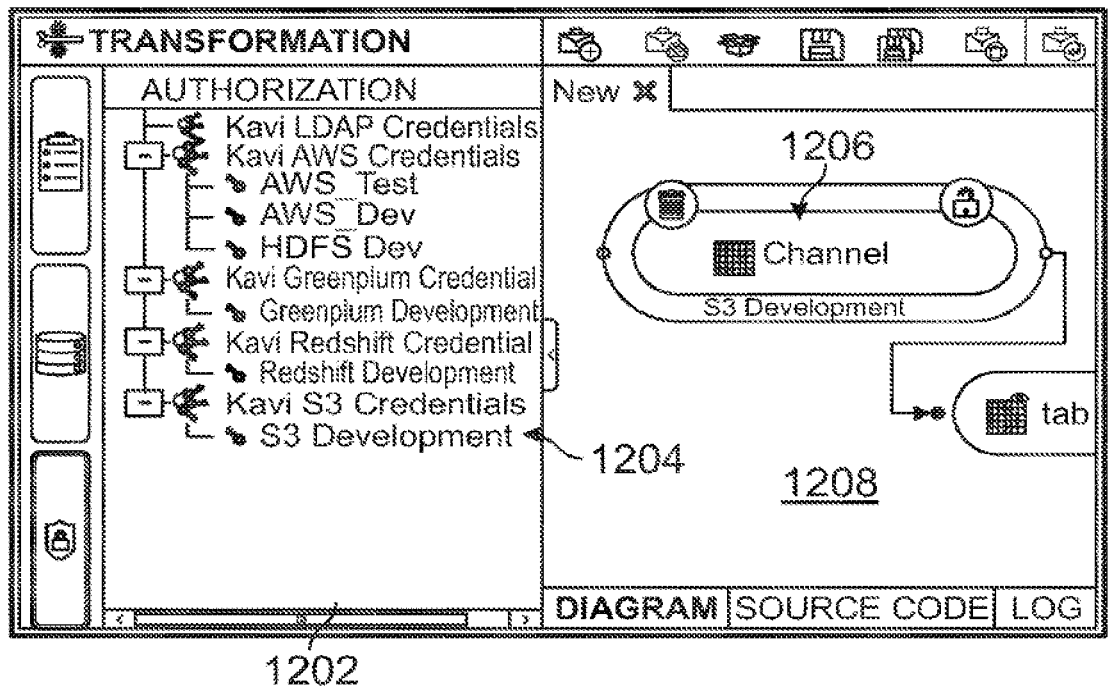

As shown in FIG. 12, a user can provide data object authorization by selecting the authorization pane 1202, selecting an authorization scheme 1204 (i.e., S3 Credentials), and dragging a selected authorization scheme onto a designated data object node 1206 on the canvas 1208.

Figure 13:
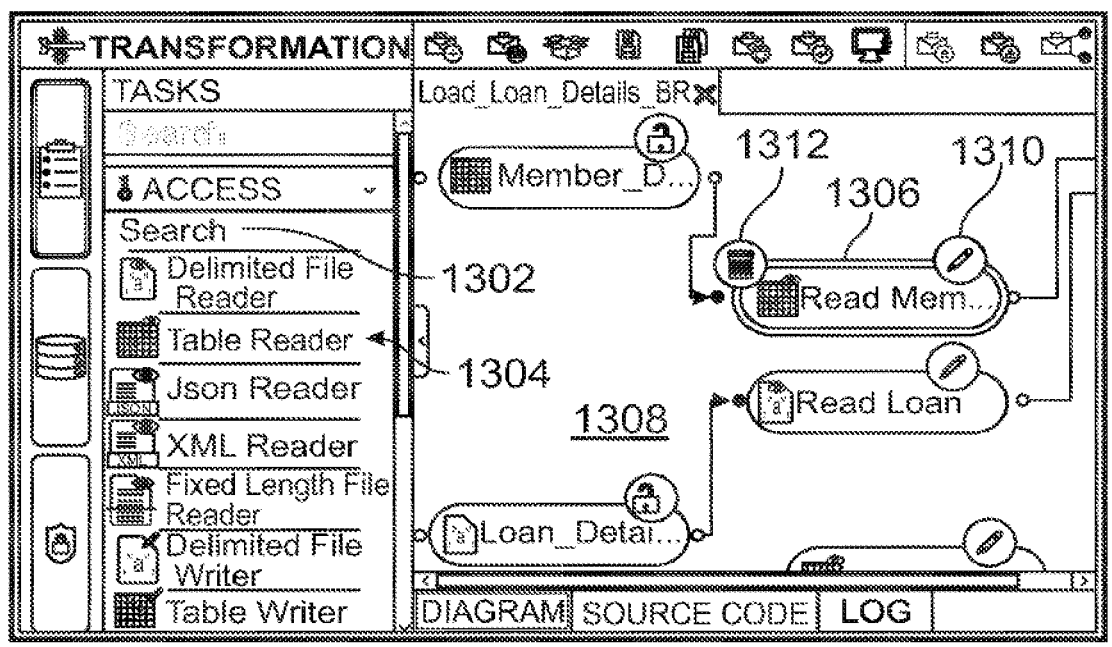
Figure 14:
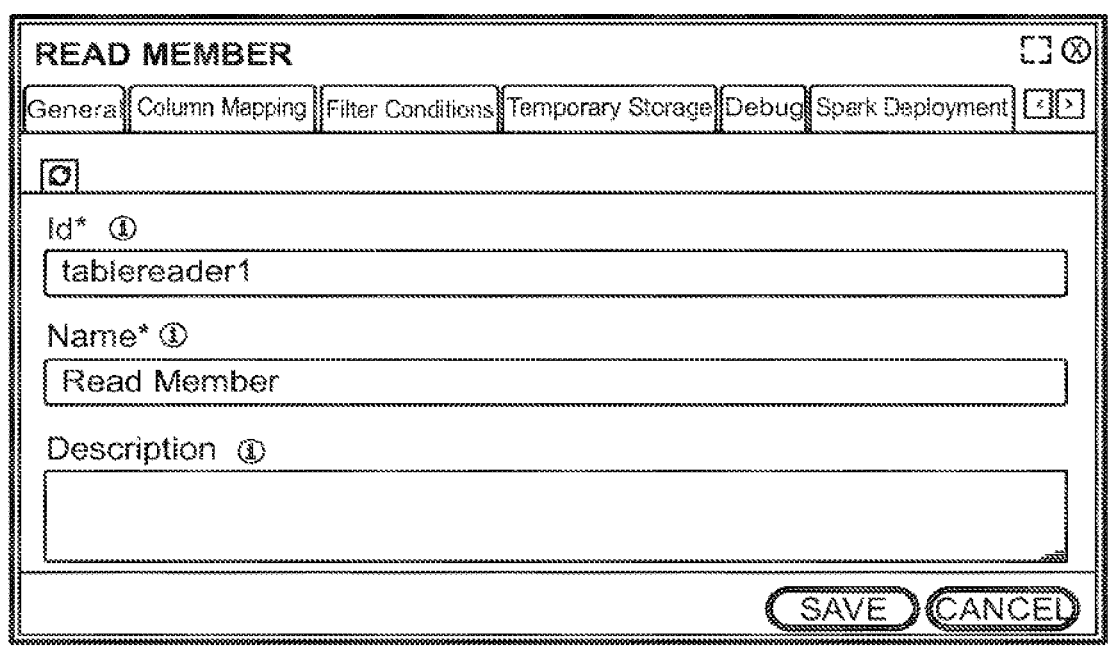

To add a task node to a job flow, as shown in FIG. 13, a user first selects the task pane 1302, selects a task group 1304, and then drags a selected task node 1306 (i.e., Read Member) onto the job canvas 1308. A task node 1306 may be edited by selecting the edit icon 1310 or deleted by selecting the delete icon 1312. Once the edit icon 1310 is selected, an edit menu 1400 is presented as shown in FIG. 14, enabling the user to edit the selected task.

Figure 15:
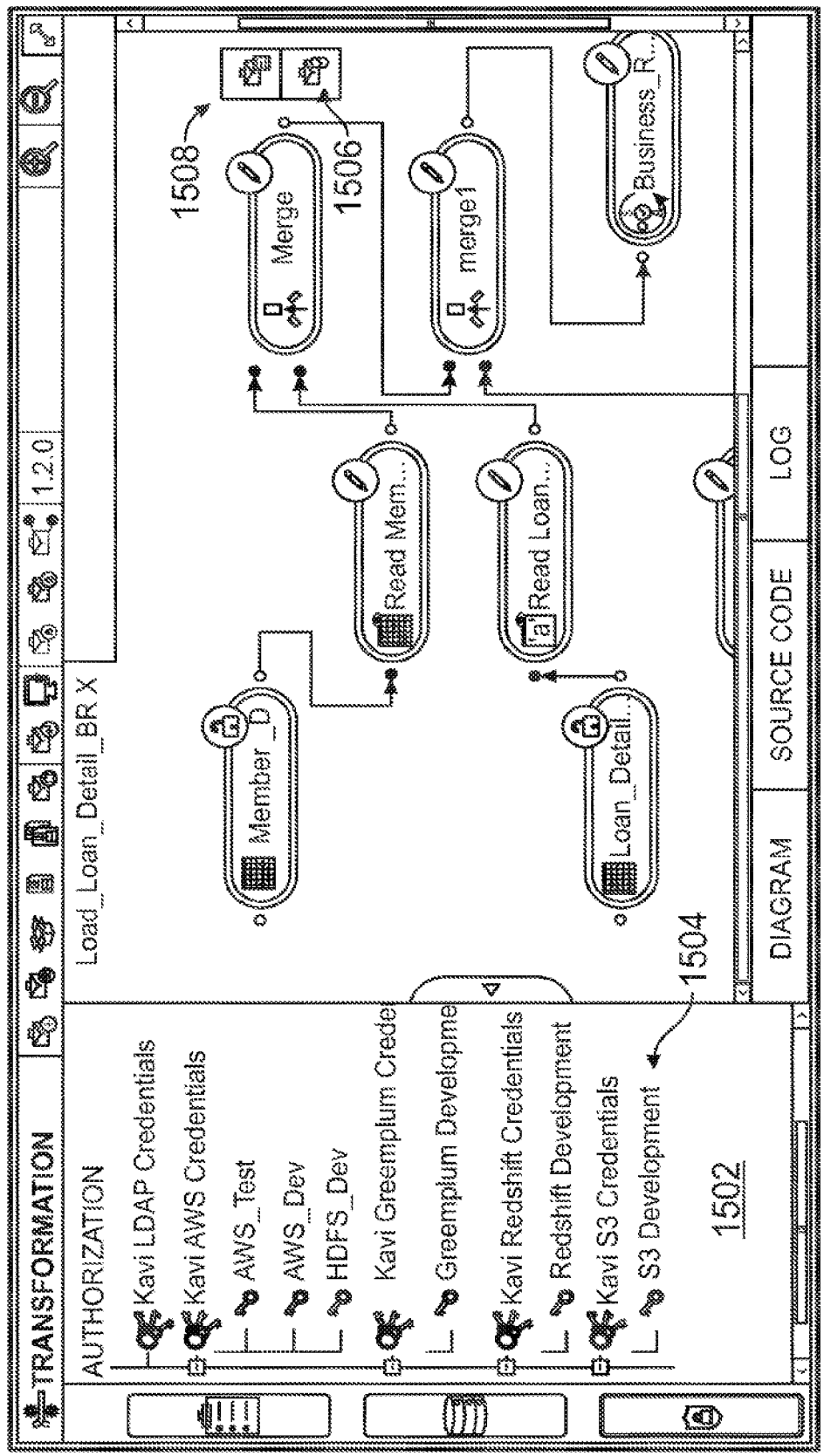
Figure 18:
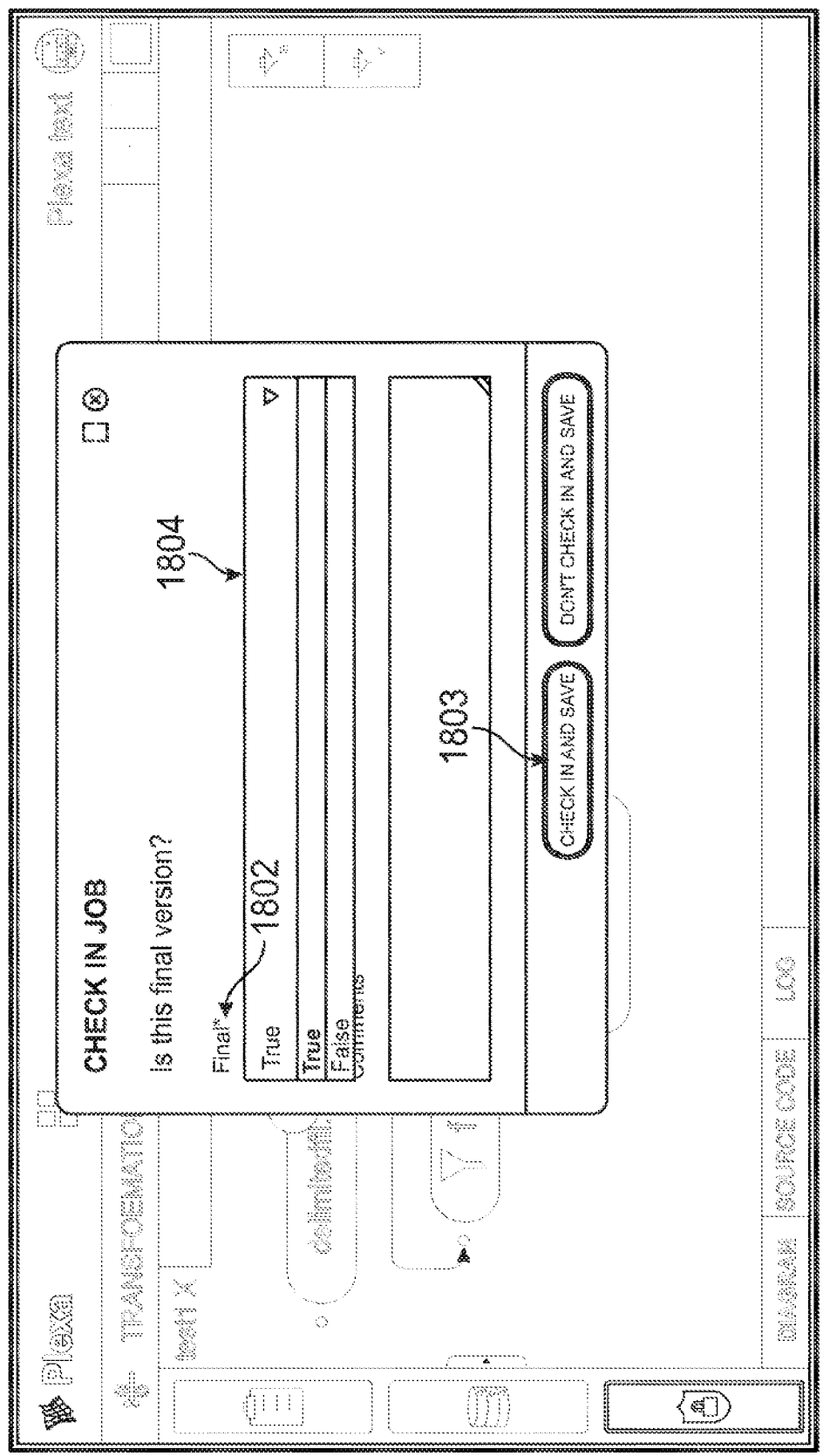
Figure 19:
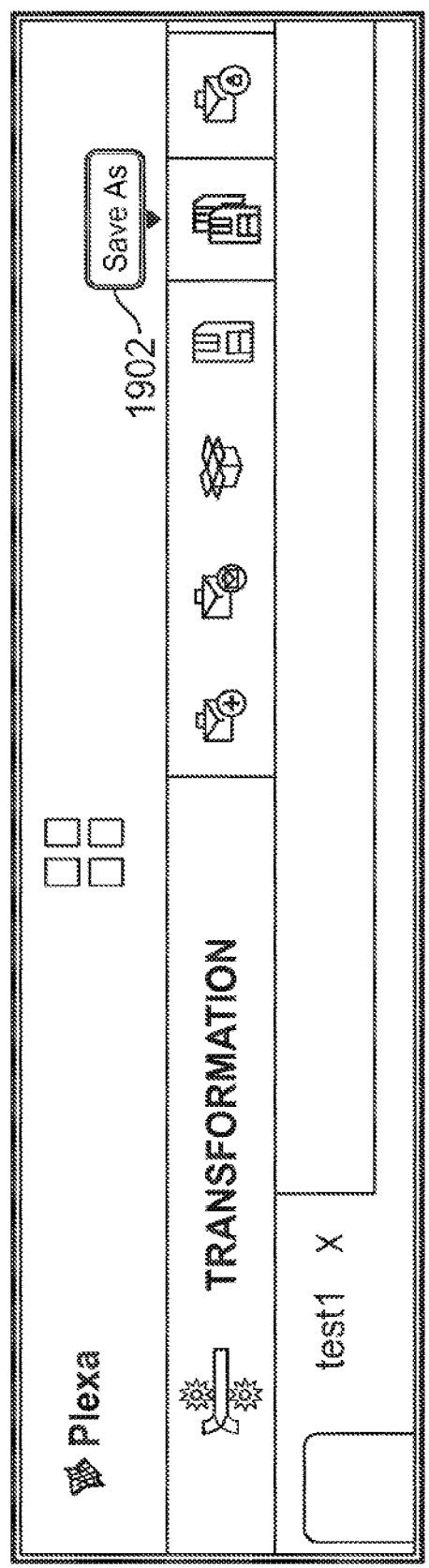
Figure 20:
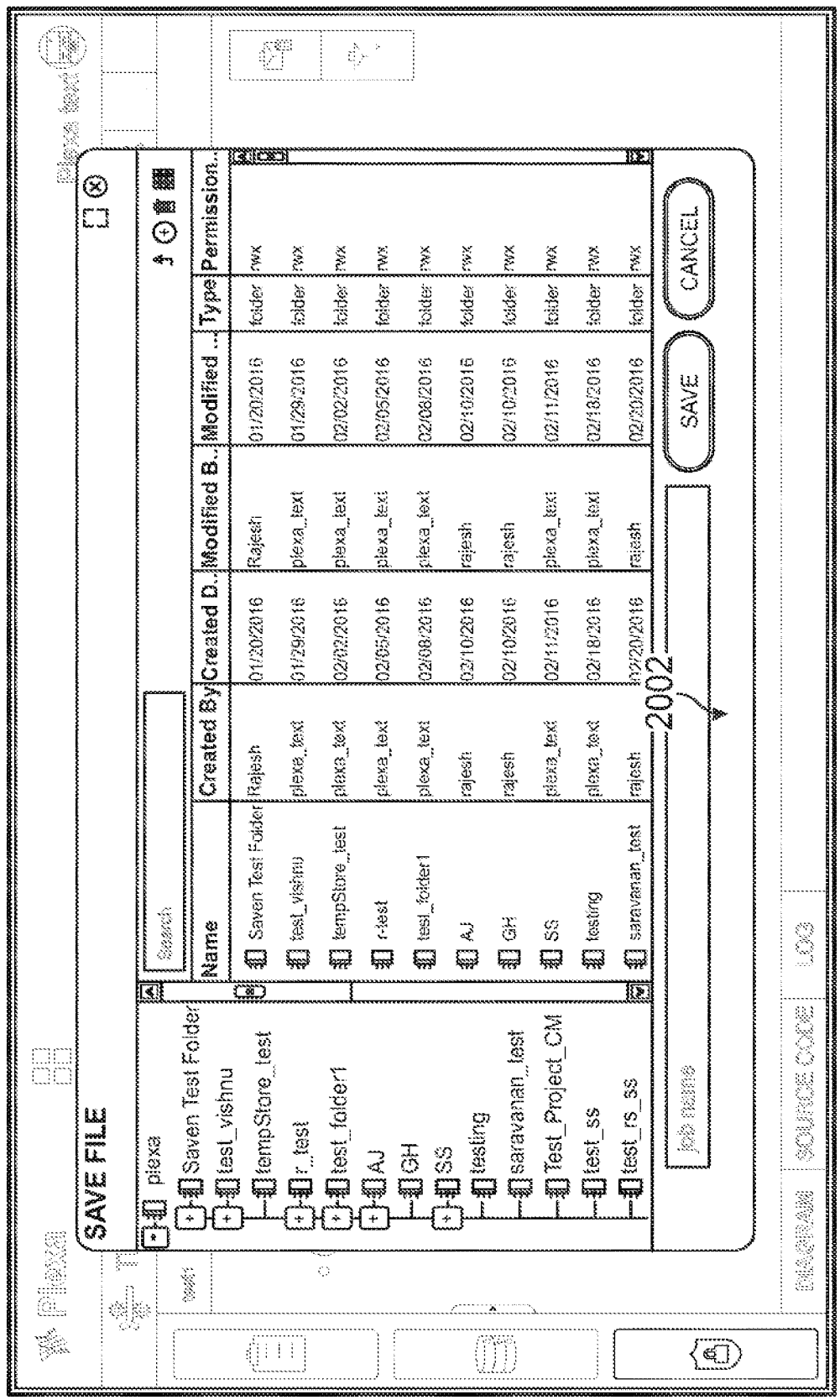
Figure 21:
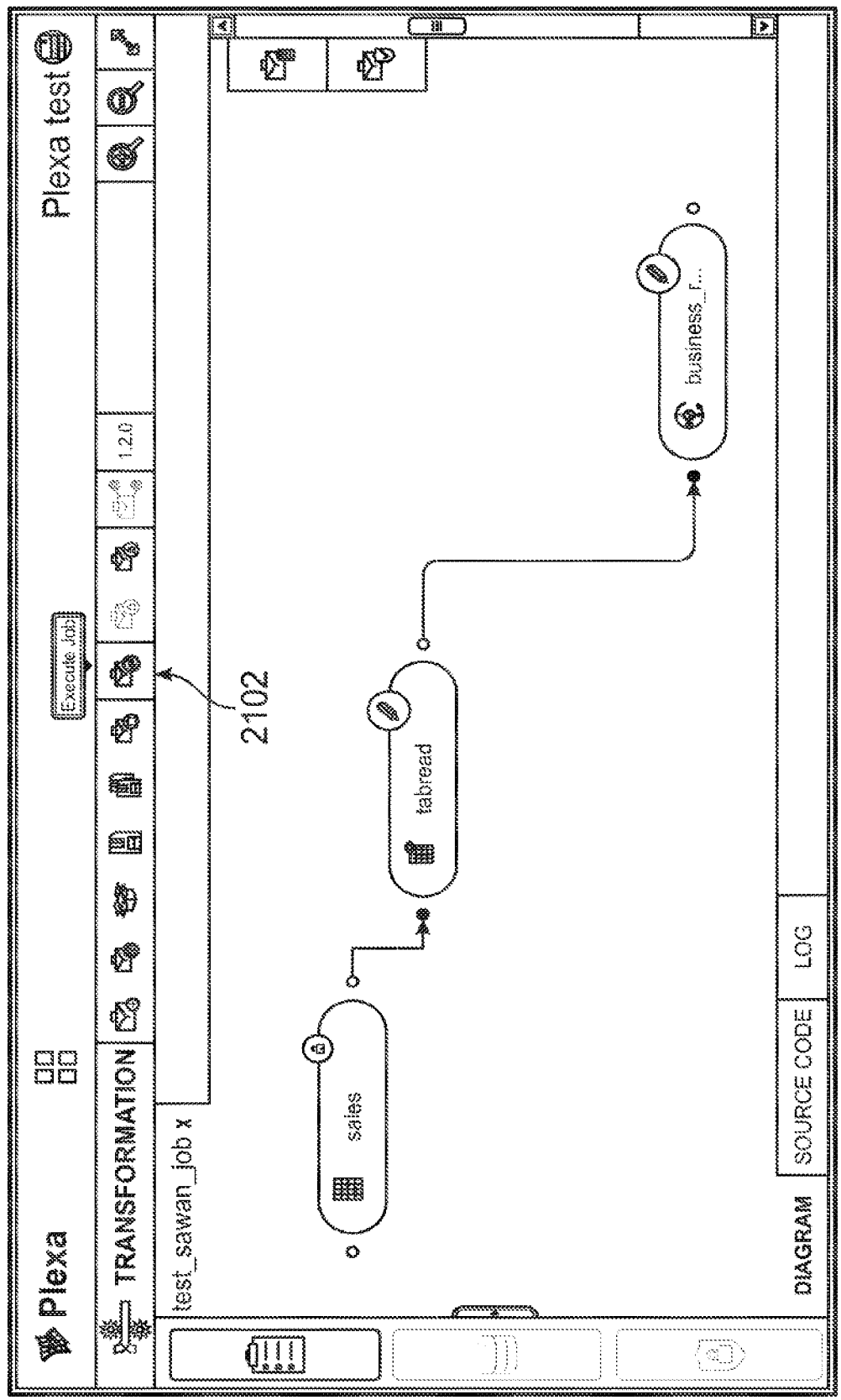
Figure 22:
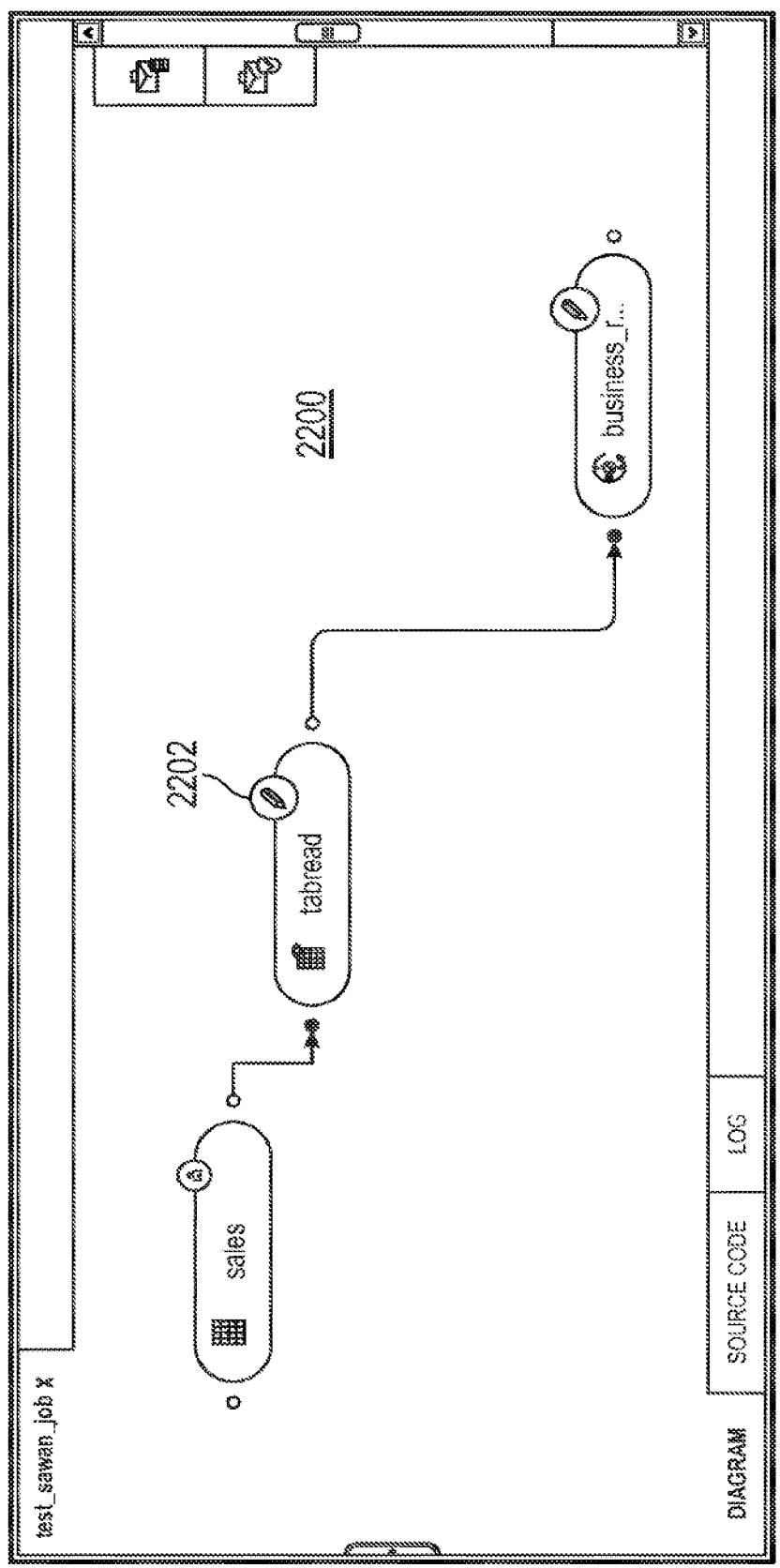
Figure 23:
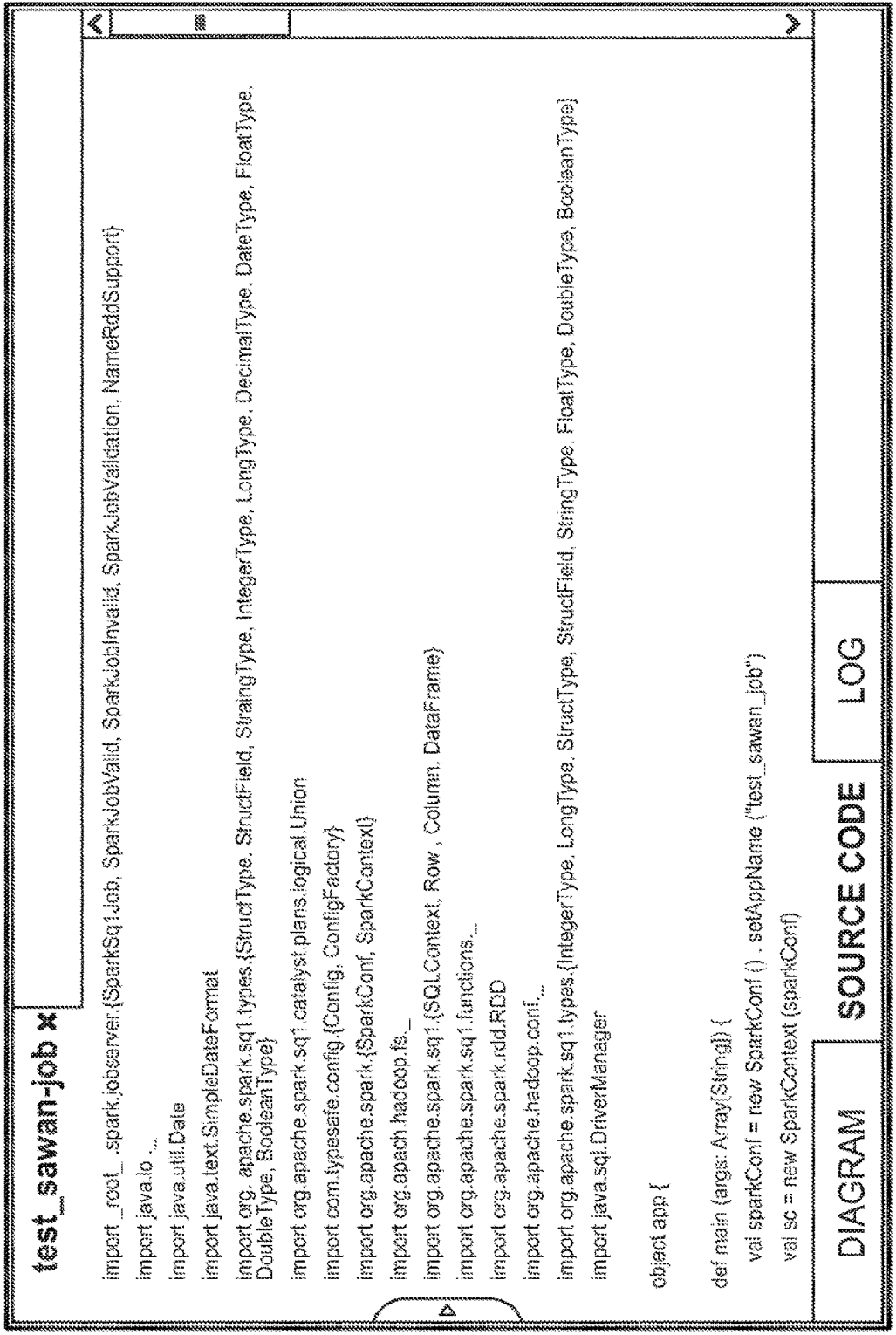
Figure 25:
Figure 26:
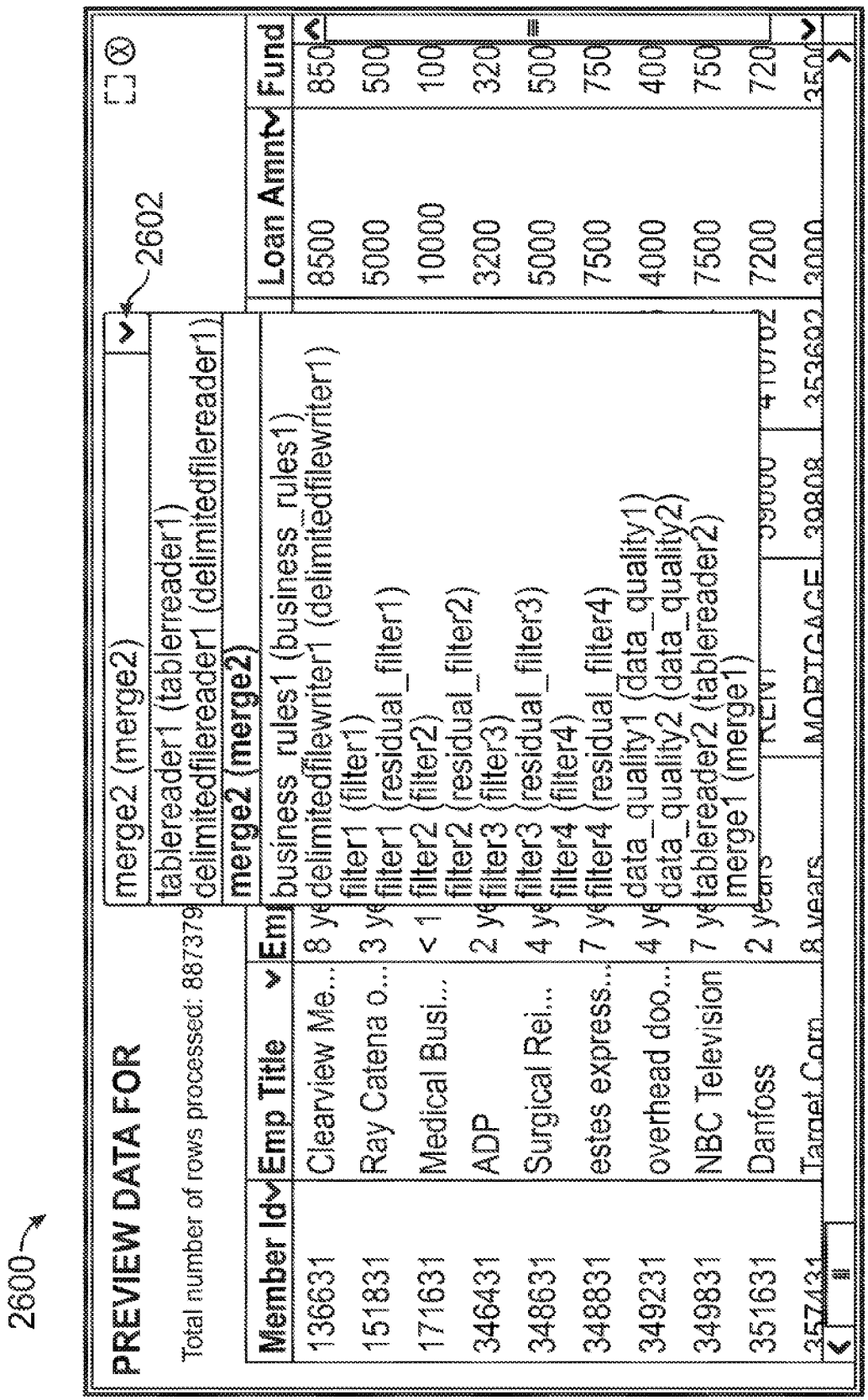
Figure 27:
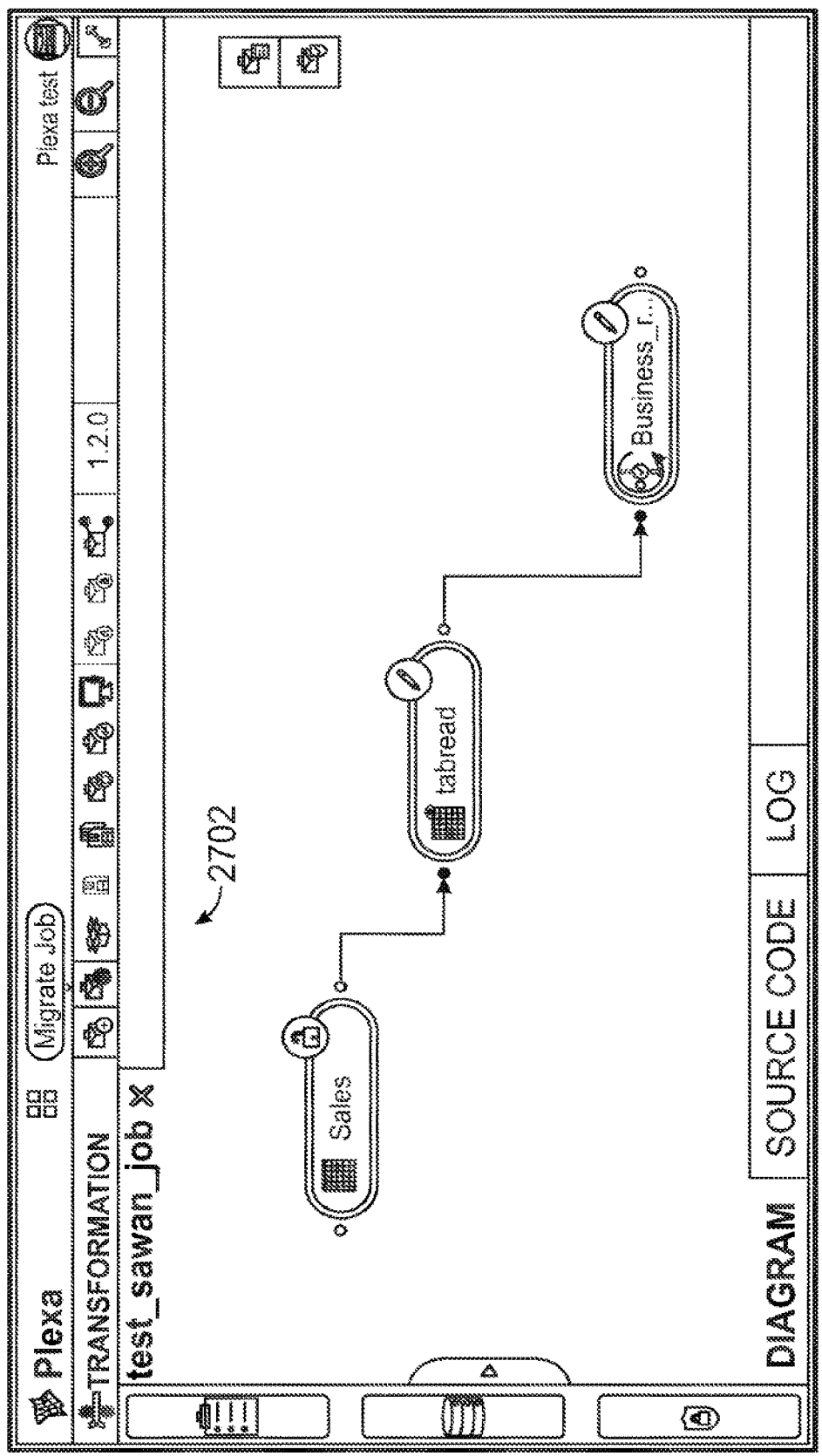

As shown in FIG. 15, a user provides job authorization using the authorization menu 1502. The user selects a desired authorization 1504 based on the mode selected for the job and drags the authorization 1504 onto the authentication icon 1506. In an embodiment, the authentication icon 1506 changes to indicate whether a job has been authorized. In an embodiment, the authentication icon 1506 is red for an unauthorized job and green for an authorized job. By selecting the job properties icon 1508, a user may view the properties of a selected job, causing the properties window 1600 to appear, as shown in FIG. 16, and permitting the user to change the description of the job 1602.

To save a job, the user selects the save icon 1702 as shown in FIG. 17, before inputting whether the version is final 1802, adding comments 1804, and finalizing the input 1806. Alternatively, the user can select the save as icon 1902 and provide a customized job name 2002.

To execute a saved job, the user selects the execute job icon 2102. During job execution, the user is presented with a diagram 2200 showing an animated icon 2202 indicating the particular node(s) being executed. The user can also see the source code 2300 (i.e., the dynamically generated source code for the chosen platform) or the log 2400 indicating the status of the job and any error messages received during processing. Once execution is complete, the icon 2202 may be updated. In an embodiment, the icon 2202 spins during processing and changes color when the node is complete.

During processing, a user can preview the output of a particular node 2204 through the preview screen 2500, 2600.

Various nodes can be selected from the drop-down menu 2602, enabling a user to quickly access the output of any node in the job.

To migrate a job from one platform to another, the user selects the migrate job icon 2702. On the migrate job menu 2800, the user selects a mode 2802 to migrate the job to, selects a version 2804 of the mode, and selects an instance 2806 to store the job. The available instances 2806 are determined based on the mode and version selected and the instances available to the given user. The user may name the new job and select a location to store it (i.e., in a particular folder in a repository on the metadata server 110).

Working with Rules

With reference to FIGS. 29-40, the following provides an illustrative example of the input provided by, and the information provided to, a user while working with rules (such as business rules and rule sets thereof) using a system in accordance with the present invention. FIGS. 29-40 are illustrative screen shots of a GUI provided to the user via the client device 202.

Figure 29:
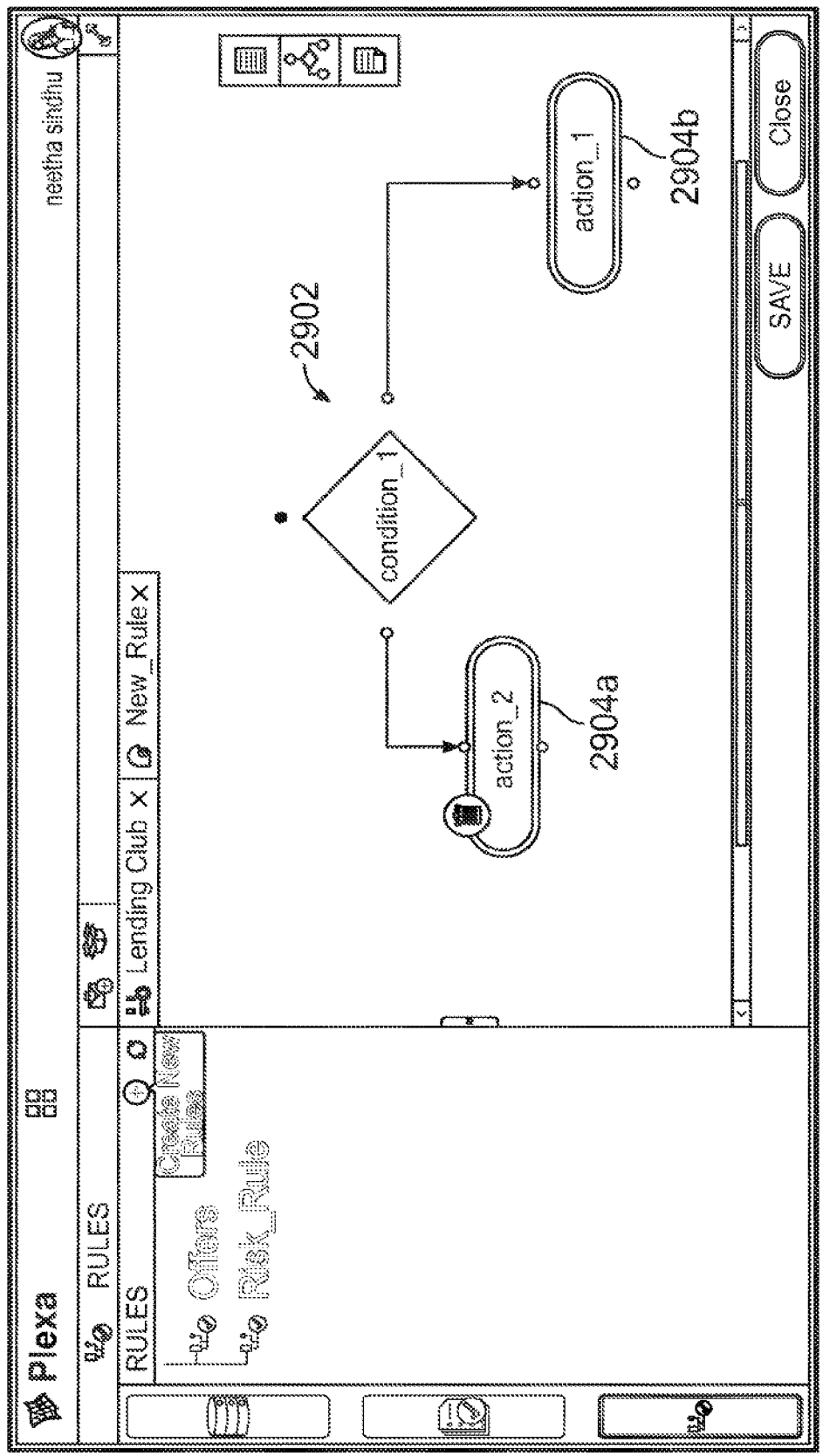
Figure 32:
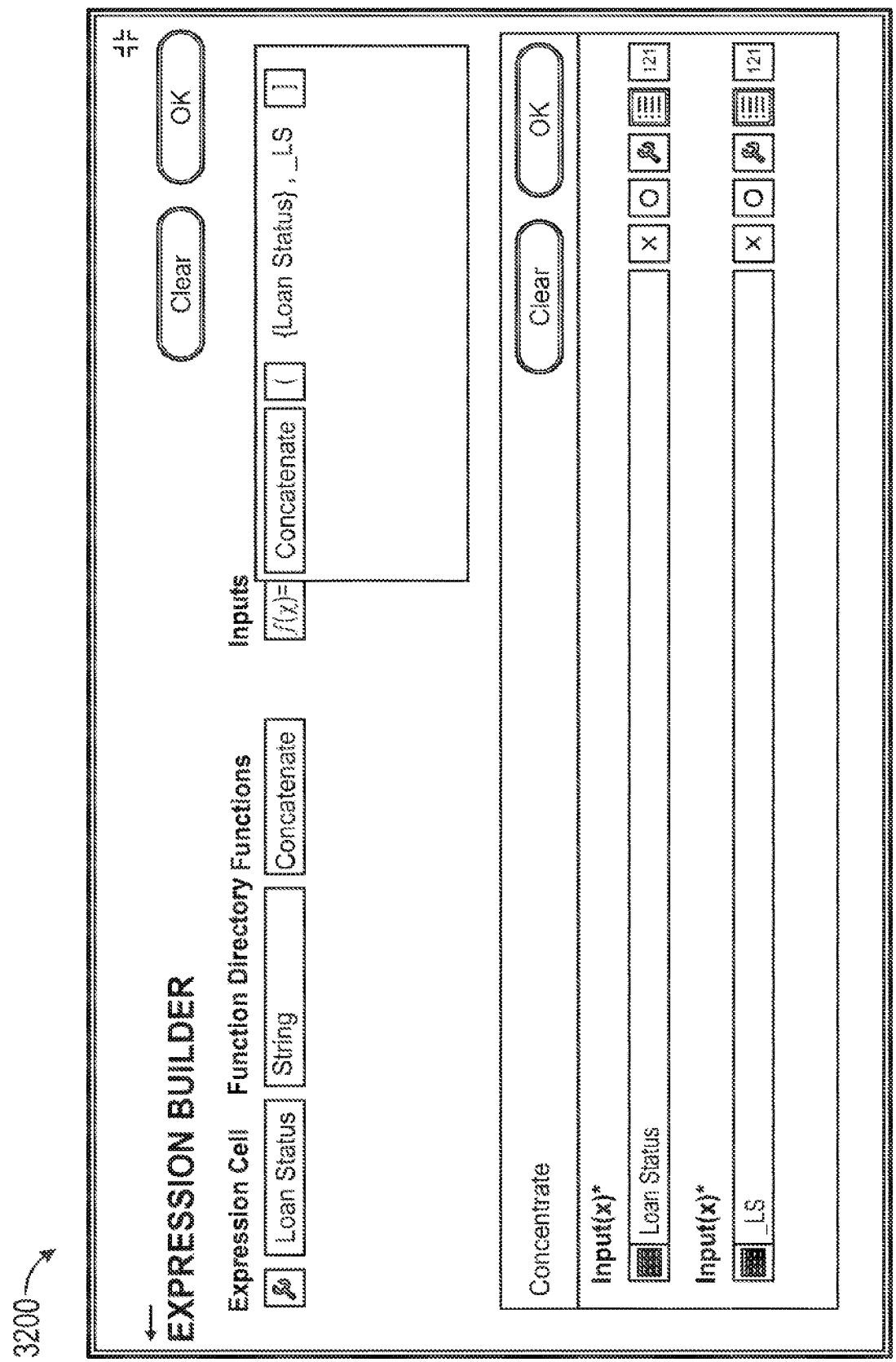
Figure 34:
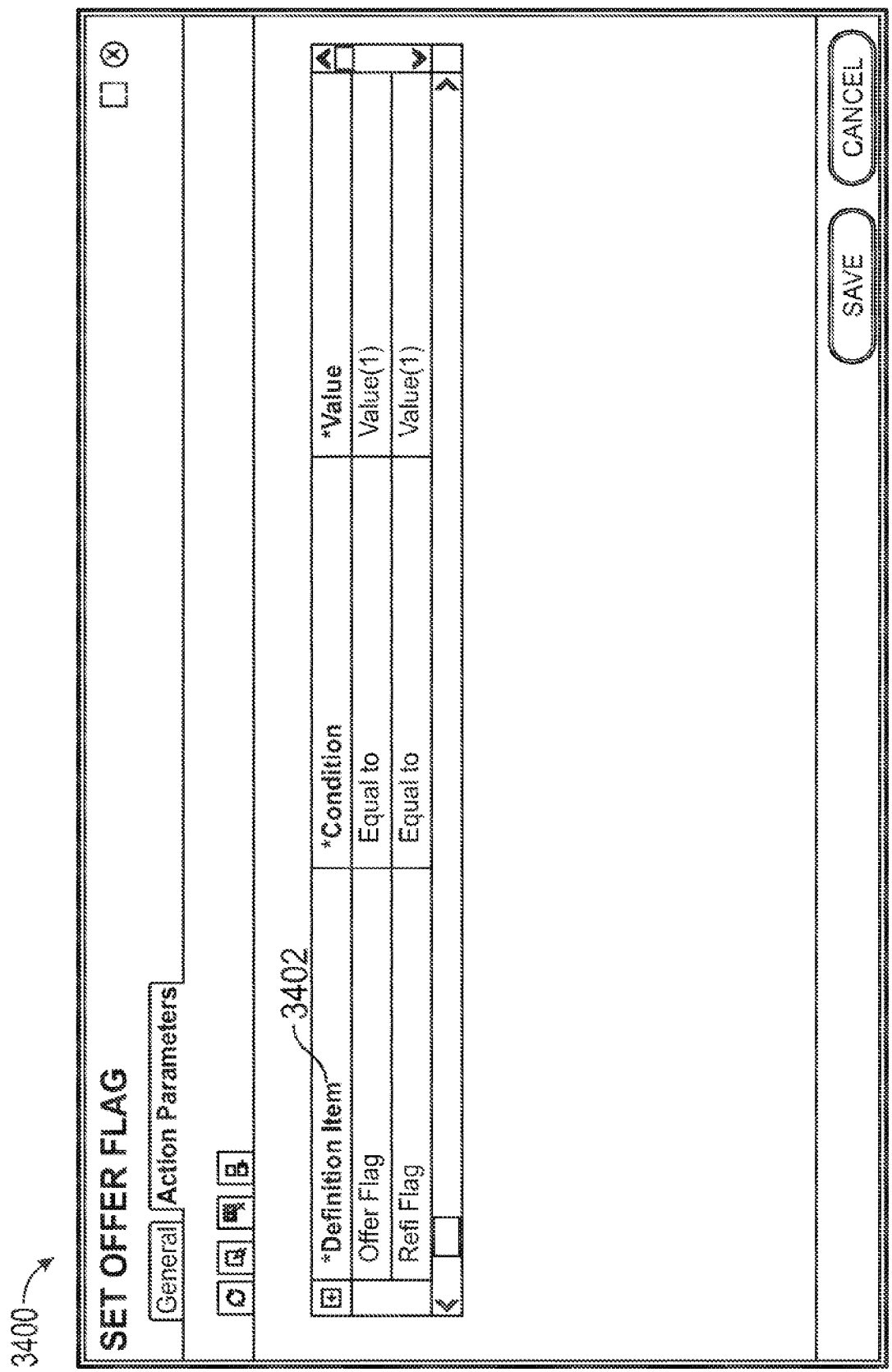
Figure 35:
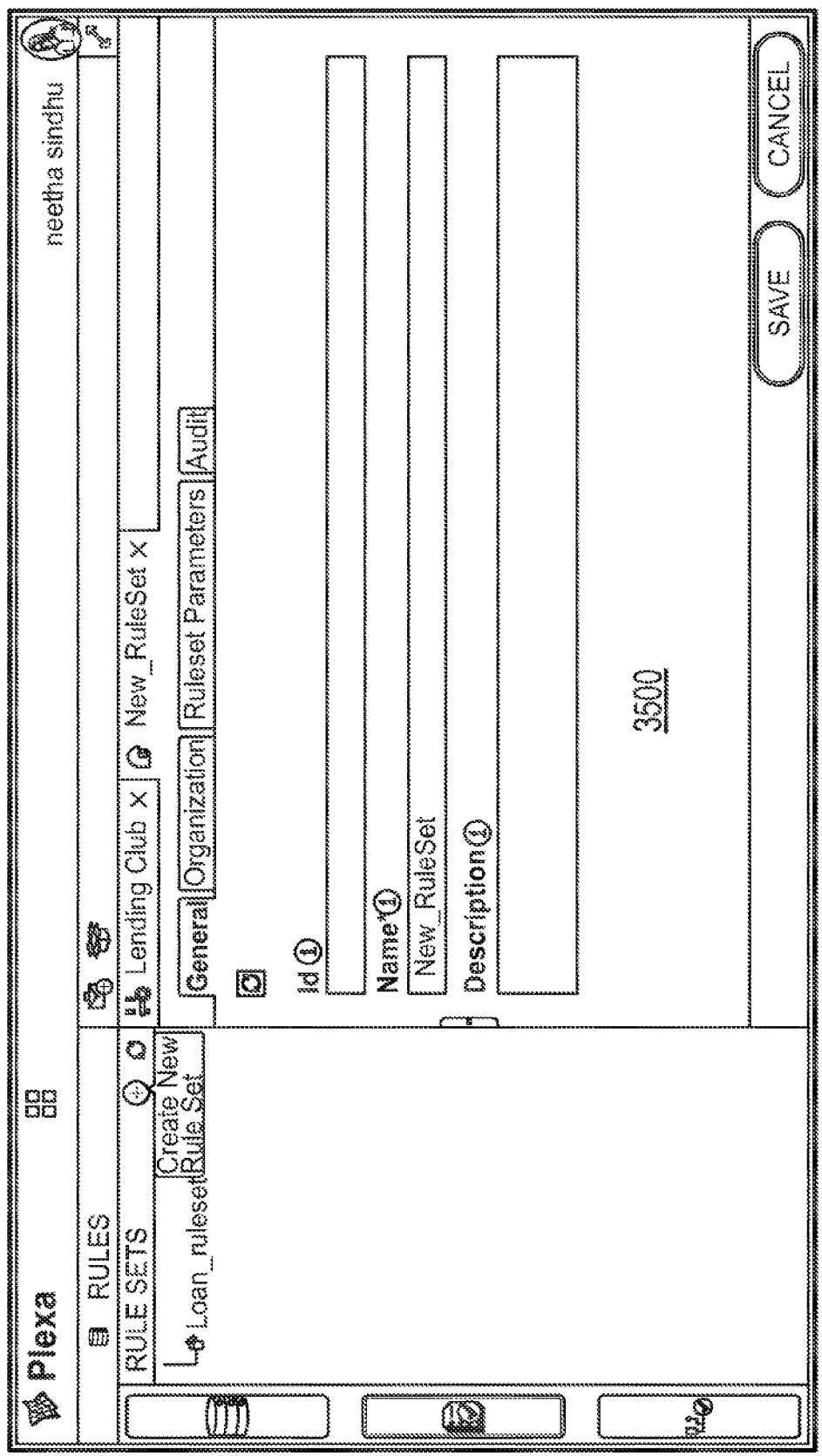
Figure 37:
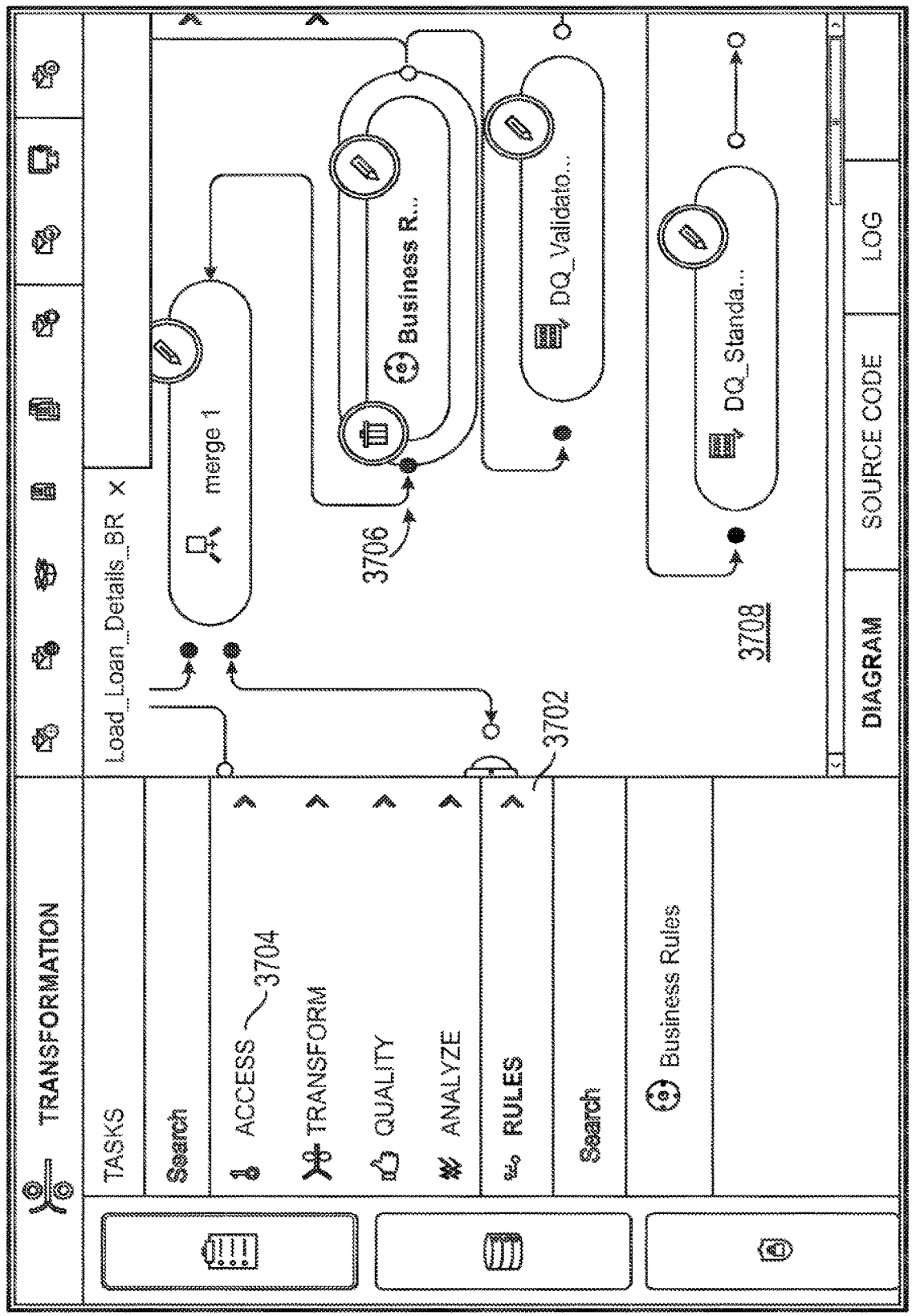
Figure 39:
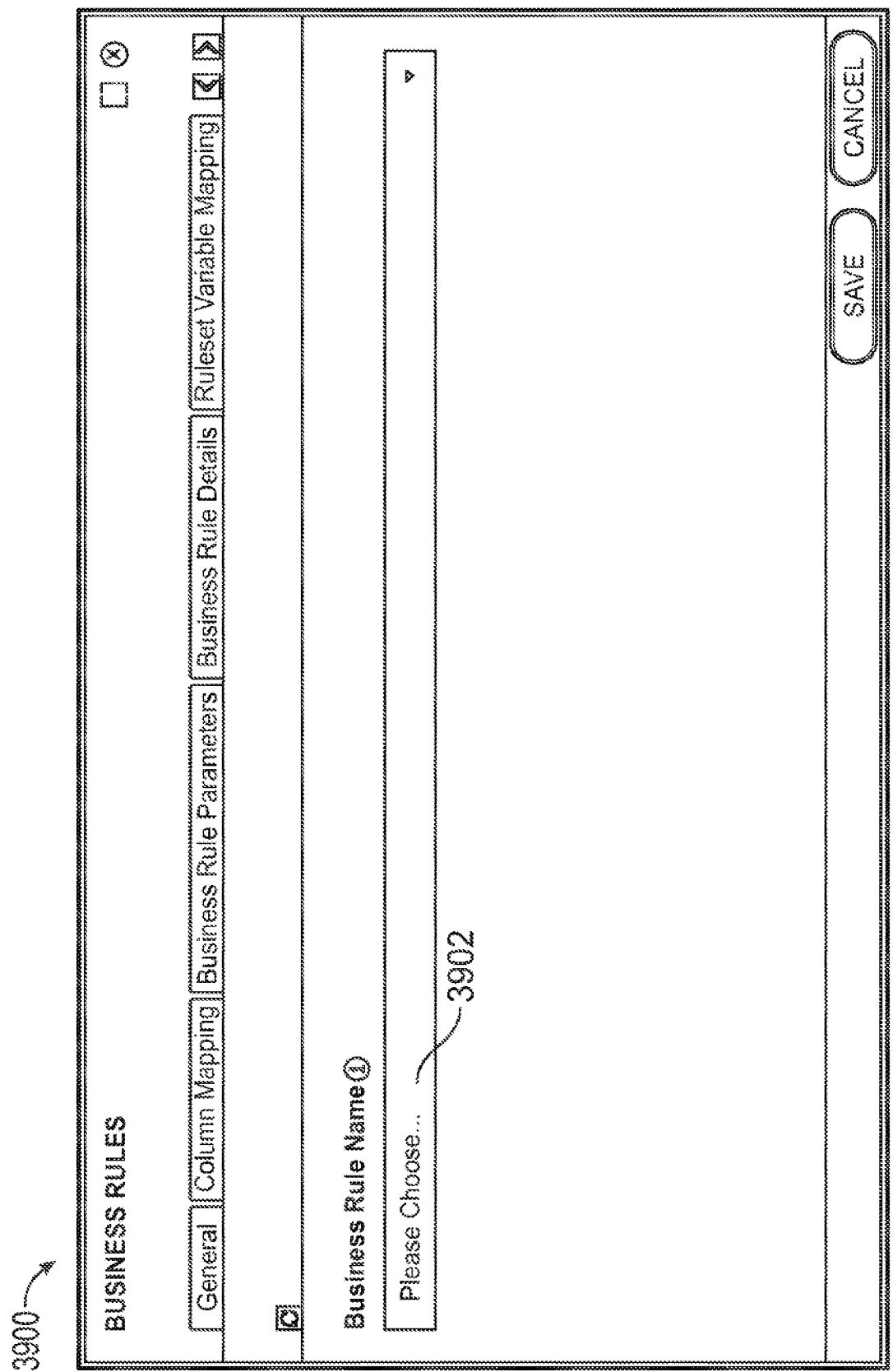
Figure 40:
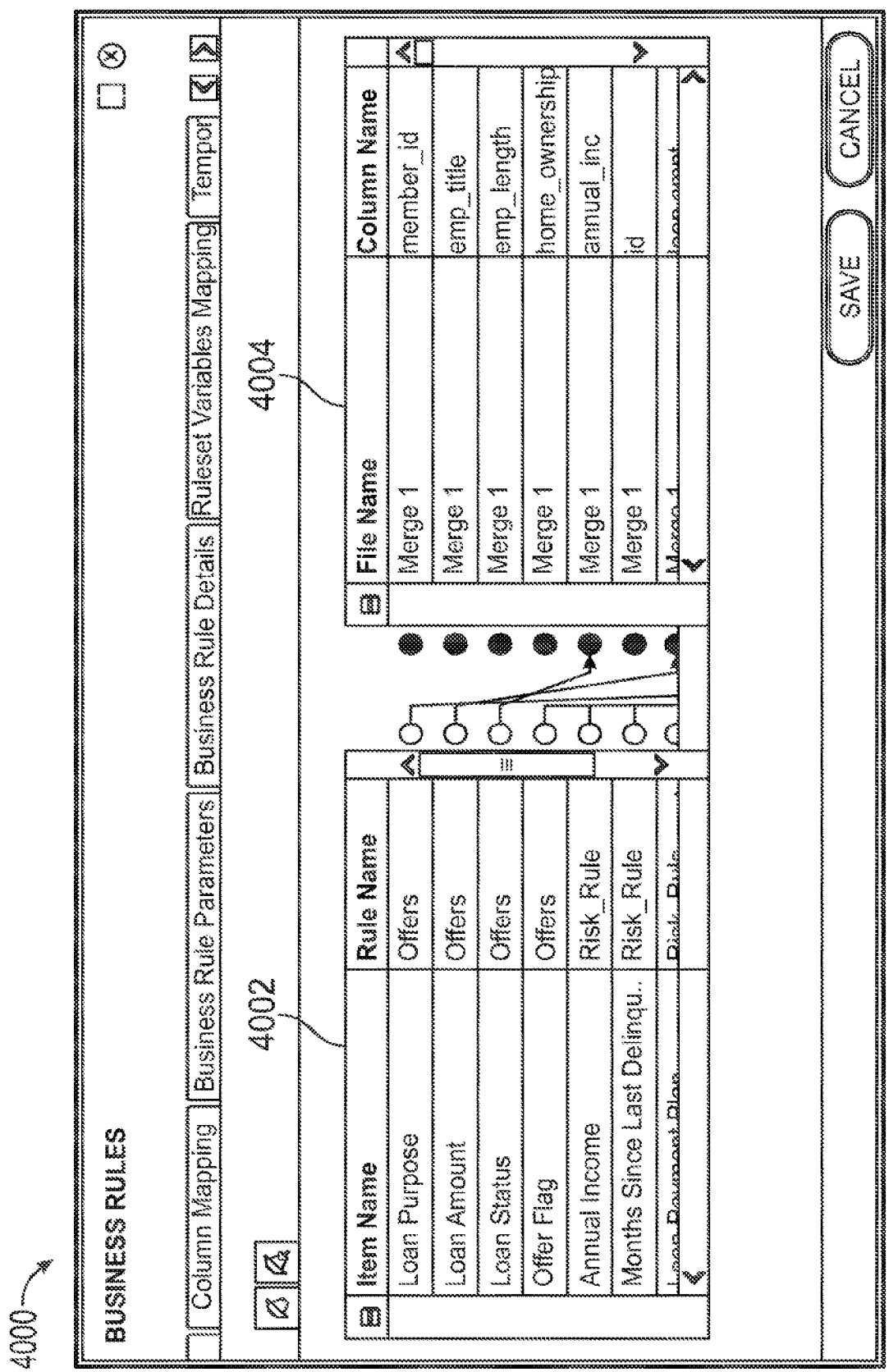

As shown in FIG. 29, the GUI presents the user with the ability to add a series of interconnected conditions 2902 and actions 2904. Conditions 2902 evaluate complex, nested specifications and resolve into a result of either true or false. Conditions are connected to actions 2904 that run only if a condition is true (i.e., action 2904a) or false (i.e., action 2904b). As illustrated, action 2 2904a will only run if the condition 2902 is true, while action 3 2904b will only run if the condition is false.

A user creates a rule by first providing general properties for the particular condition, as shown in FIG. 30. For example, a user may provide the name 3002 and a description 3004 of the condition. Next, as shown in FIG. 31, the user employs the tree-structure interface 3100 to build the condition. Logical operators may be used to interconnect various conditions. The expression builder window 3200 is used to evaluate the values in each group and string numerous values together.

Similarly, the process for creating an action begins with filling out general properties for the action in the action window 3300, such as the name 3302 and description 3304. The user then assigns values to one or more variables 3402 using the action properties window 3400. Values are assigned for use within the expression builder 3200.

A rule set (one or more rules grouped together with a specified order) may be created using the rules window 3500. Rules are added as row entries 3602 in the rule set parameters window 3600, and an order may be specified 3604. Existing rules may also be deleted at the same time.

To add a task, the user first expands a group of rules 3702 on the task pane 3704 and drags the desired node (i.e., business rules node 3706) onto the canvas 3708. Once added, the business rules node 3706 can be edited, including by adding a particular project 3802 and rule set 3804 using the business rule parameters window 3800. On the business rule details window 3900, a user may select from pre-populated business rule names 3902. Finally, using the mapping window 4000, a user may map items 4002 (i.e., variables manipulated by the business rule) to the particular data on which the business rule will operate (i.e., columns of data). In this way, a logical business rule may be configured to work with different data sets without the need for the user to manipulate executable code. Instead, the user employs the single GUI and the necessary code is generated automatically, as described herein.

Working with Checks

With reference to FIGS. 41-54, the following provides an illustrative example of the input provided by, and the information provided to, a user while working with checks using a system in accordance with the present invention. FIGS. 41-54 are illustrative screen shots of a GUI provided to the user via the client device 202.

Figure 41:
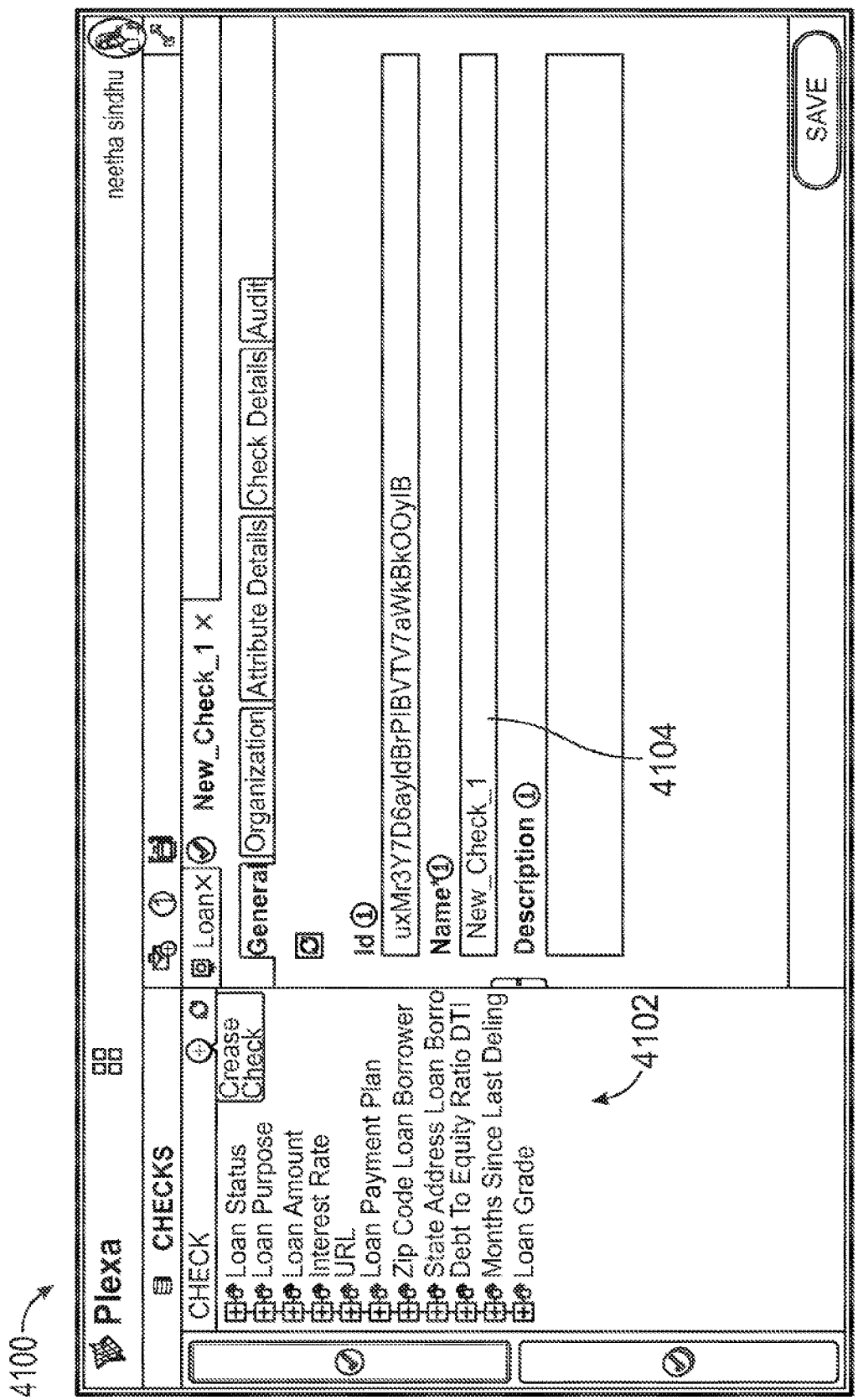
Figure 42:
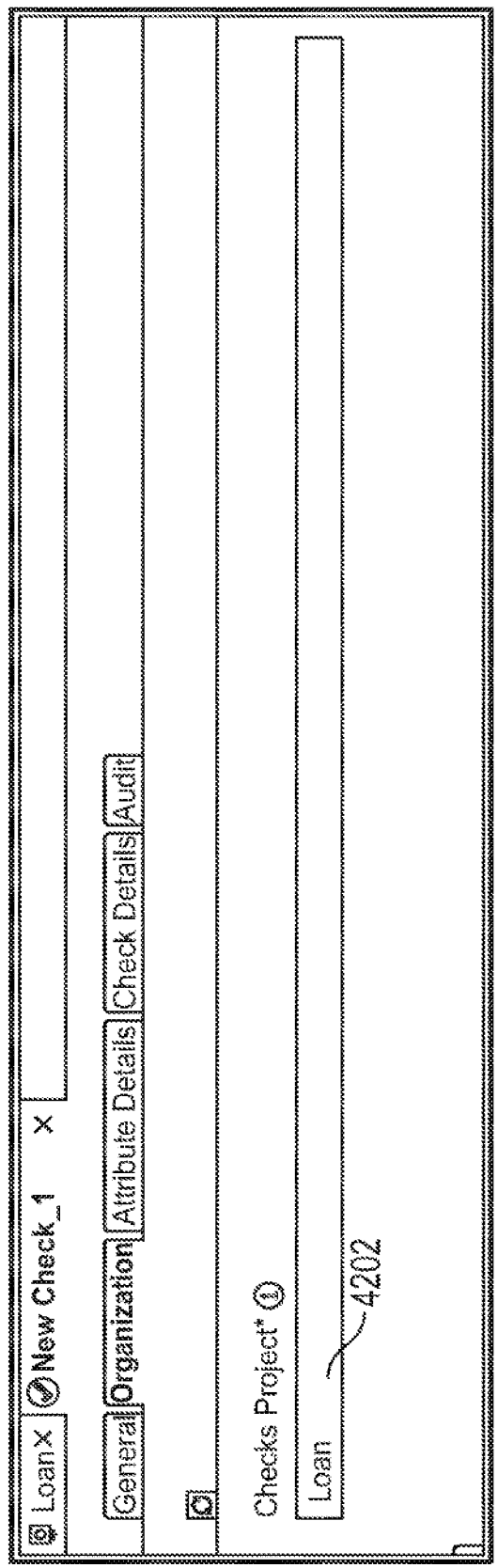

As shown in FIG. 41, the GUI presents the user with a menu providing existing checks 4102. Each check 4102 is a type standardization or validation operation that may be performed on data. Checks 4102 may be performed individually or as part of an ordered operation, as defined by the user. A validation check determines whether data is valid (i.e., meets a condition defined by the user) and if not, takes corrective action as specified by the user. Alternatively, for a standardization check, data is manipulated as necessary to comply with a specified standard. When creating a new check 4102, the user employs the check creation window 4100 and inputs a name 4104 and general description 4106 of the check. As shown in FIG. 42, a user may specify a location 4202 to store the check 4102 (i.e., in a particular folder in a repository on the metadata server 110). The user selects an attribute from the drop-down menu 4302.

Figure 44:
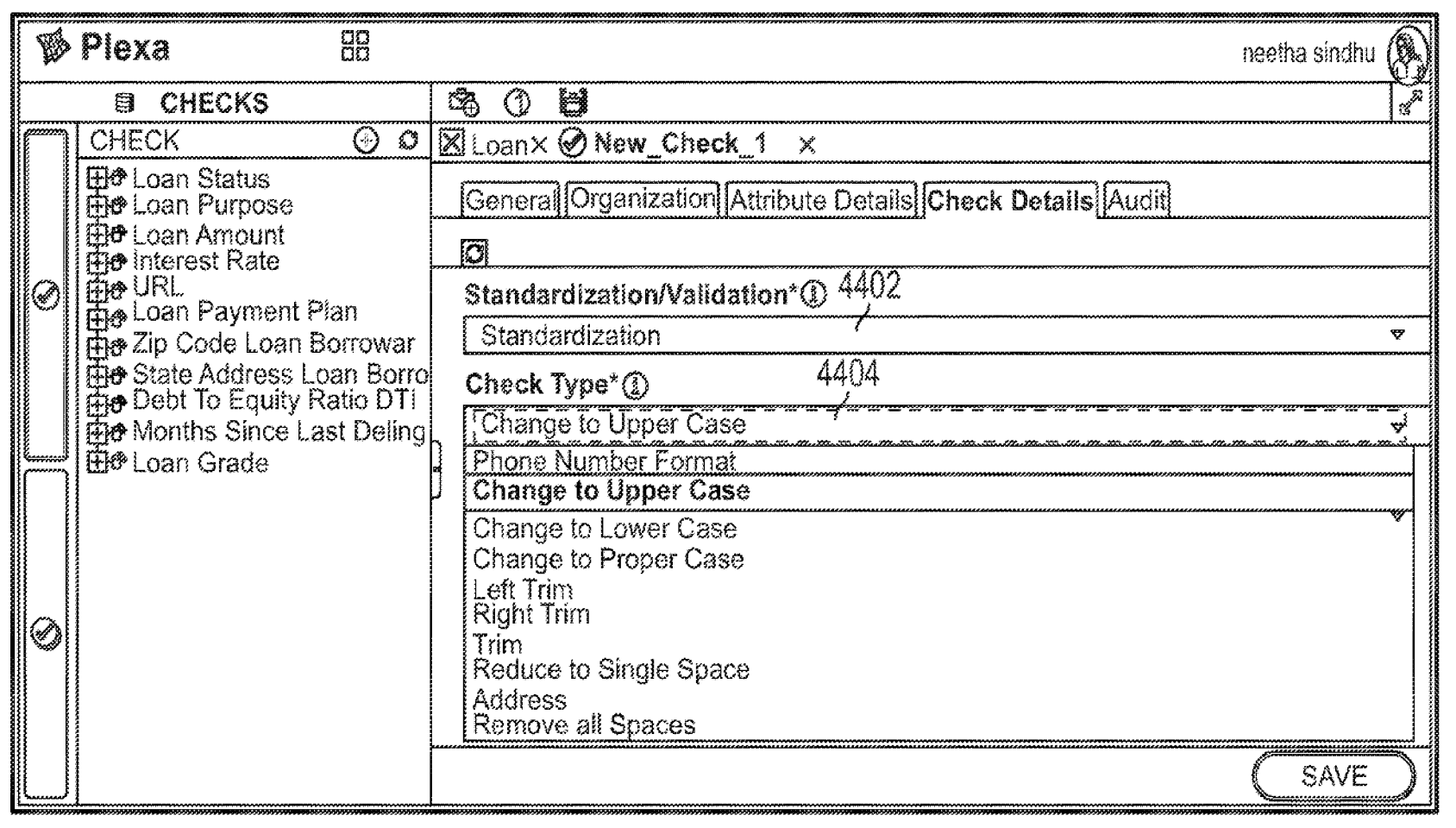

For a standardization check, the user sets the type 4402 to be "standardization" as shown in FIG. 44 and selects a form of standardization from the drop-down list 4404 of available standardization checks.

Figure 45:
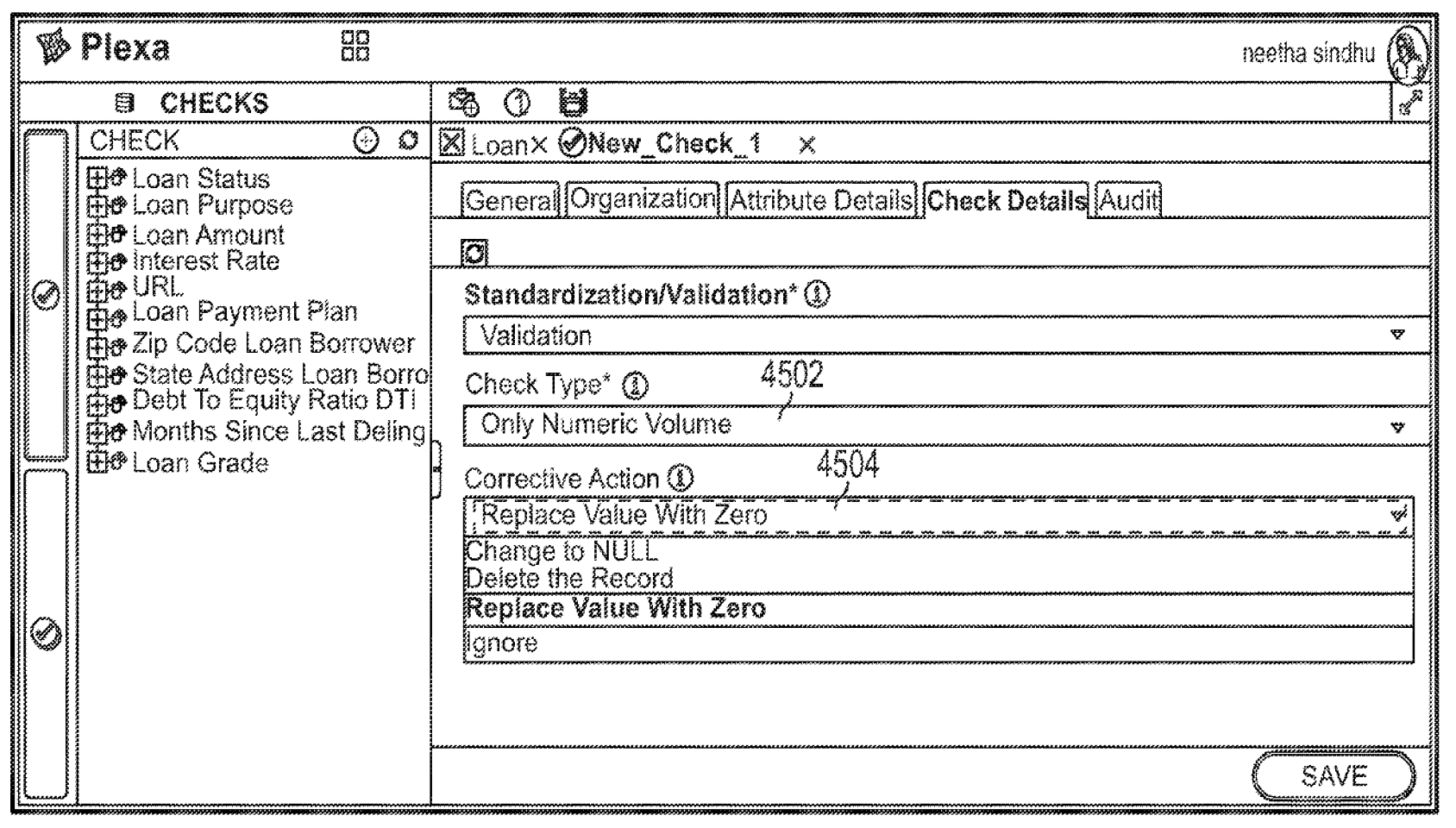

For a validation check, the user sets the type 4402 to be "validation" as shown in FIG. 45 and selects the type of validation to perform from a drop-down list 4502. Next, the user selects a corrective action 4504 to perform for any values that violate the criterion. In various embodiments, additional parameters may also be input, depending on the type of validation check selected and the particular requirements of the software platform on which the validation check will be processed. An existing check 4102 may be selected from the menu 4602 and once selected, may be edited in the editing window 4604.

Figure 48:
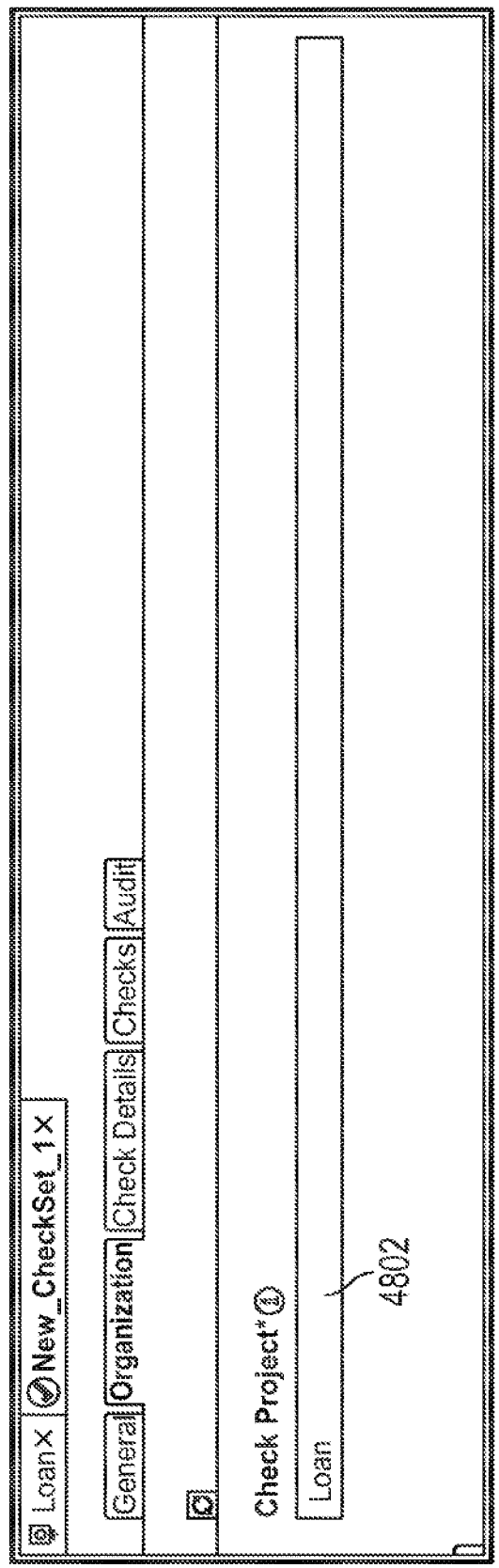
Figure 52:
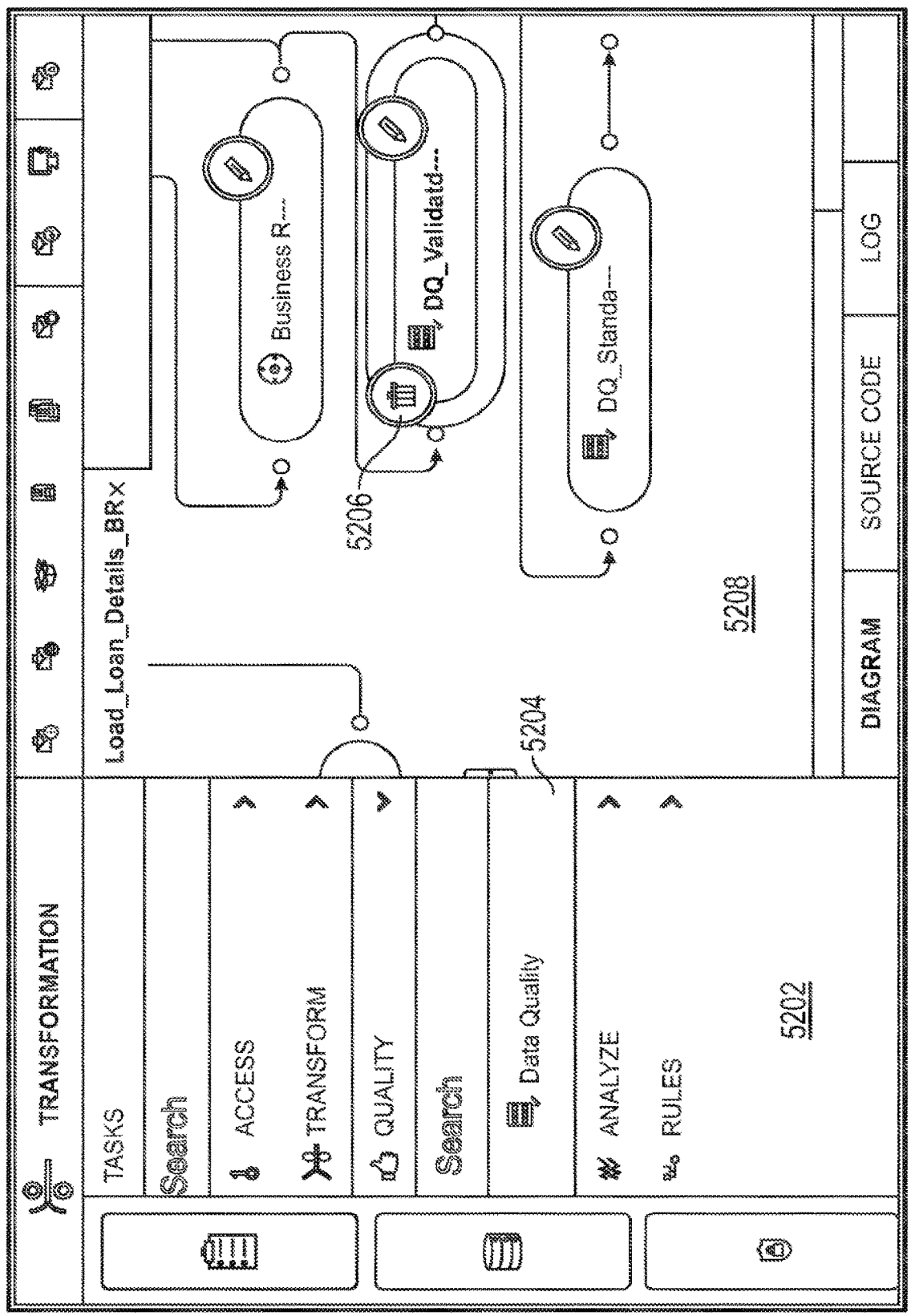

A check set comprising a plurality of checks 4102 may be created using the check set creator window 4700. A check set 4702 is a set of checks grouped together in a certain order for a particular entity or attribute, and may be embedded into a code transformation job (i.e., to perform multiple checks in a specified order at once). When creating a new check set 4702, the user employs the check creation window 4700 and inputs a name 4704 and general description 4706 of the check. As shown in FIG. 48, a user may specify a location 4802 to store the check set 4702 (i.e., in a particular folder in a repository on the metadata server 110). The user selects whether the check set 4702 is for use with an attribute or an entity from the drop-down menu 4902 and selects a specific attribute or entity to apply the check to from the drop-down menu 4904. Next, the user selects specific checks 4102 for inclusion in the check set 4702 using the table 5000.

Alternatively, an existing check 4702 may be selected from the menu 5102 and once selected, may be edited in the editing window 5104.

A task to perform a quality check may be added to an existing job using the tasks pane 5202. Under the quality menu 5204, a particular data quality task node 5206 may be selected and dragged onto the job canvas 5208, thereby adding it to the job. Once added, the properties of the node 5206 may be adjusted by selecting from pre-populated menus of data quality check projects 5302 and check sets 5304.

As shown in FIG. 54, using the mapping window 5400, the variables 5402 associated with a particular node 5206 may be mapped to items 5404 within the data set being analyzed. In this way, a logically defined data check node may be configured to work with different data sets without the need for the user to manipulate executable code. Instead, the user employs the single GUI and the necessary code is generated automatically, as described herein.

It is understood that the preceding is merely a detailed description of some examples and embodiments of the present invention and that numerous changes to the disclosed embodiments can be made in accordance with the disclosure made herein without departing from the spirit or scope of the invention. The preceding description, therefore, is not meant to limit the scope of the invention but to provide sufficient disclosure to one of ordinary skill in the art to practice the invention without undue burden.

Furthermore, while the particular preferred embodiments have been shown and described, it is obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective, based on the related art.

What is claimed is:

1. A system comprising a processor communicatively coupled to a non-transitory memory containing a program configured to call the processor to implement a backend services module communicatively coupled to a code generation fulfiller and execute the steps of:

creating, by the backend services module, a first code generation request specifying a first identity of a first software platform and a set of metadata comprising a plurality of nodes each corresponding to a respective one of a plurality of operations to be performed, a plurality of node properties for the plurality of nodes, and an execution order for the plurality of nodes, wherein the set of metadata is created in a logical format that is independent of a set of platforms comprising at least the first software platform and a second software platform that is different from the first software platform and the logical format is compatible with the set of platforms and is not a source code format specific to any of the set of platforms and wherein at least one of the plurality of node properties comprises a data transformation instruction or an analytical instruction;

retrieving, by the code generation fulfiller, a first plurality of code templates, each containing first executable code and first placeholders and corresponding to a respective one of the plurality of nodes, wherein the first plurality of code templates is selected based on the first identity of the first software platform, and wherein the first executable code is executable on the first software platform;

based on the execution order for the plurality of nodes, identifying, by the code generation fulfiller, parallel and dependent ones of said plurality of nodes and determining a node order sequence;

transforming, by the code generation fulfiller, the set of metadata into first generated executable code capable of execution on the first software platform based on the first plurality of code templates by merging the first executable code of the first plurality of code templates together based on the node sequence order;

replacing, by the code generation fulfiller, the first placeholders in the first generated executable code based on the node properties;

creating, by the backend services module, a second code generation request specifying a second identity of a second software platform and the set of metadata;

retrieving, by the code generation fulfiller, a second plurality of code templates, each containing second executable code and second placeholders and corresponding to a respective one of the plurality of nodes, wherein the second plurality of code templates is selected based on the second identity of the second software platform, and wherein the second executable code is executable on the second software platform;

transforming, by the code generation fulfiller, the set of metadata into second generated executable code capable of execution on the second software platform by merging the second executable code of the second plurality of code templates together based on the node sequence order, wherein the first generated executable code is configured to be run on the first software platform to perform the data transformation instruction or the analytical instruction specified by the at least one of the plurality of node properties and the second generated executable code is configured to be run on the second software platform to perform the data transformation instruction or the analytical instruction specified by the at least one of the plurality of node properties.

2. The system of claim 1, wherein at least a portion of the first generated executable code is configured when executed on the first software platform, to perform a data transformation operation on a data set based on the data transformation instruction.

3. The system of claim 1, wherein at least a portion of the first generated executable code is configured when executed on the first software platform, to perform an analytical operation on a data set based on the analytical instruction.

4. A computer-implemented method performed on a system comprising a backend services module communicatively coupled to a code generation fulfiller, the method comprising:

creating a first code generation request specifying a first identity of a first software platform and a set of metadata comprising a plurality of nodes each corresponding to a respective one of a plurality of operations to be performed, a plurality of node properties for the plurality of nodes, and an execution order for the plurality of nodes, wherein the set of metadata is created in a logical format that is independent of a set of platforms comprising at least the first software platform and a second software platform that is different from the first software platform and the logical format is compatible with the set of platforms and is not a source code format specific to any of the set of platforms and wherein at least one of the plurality of node properties comprises at least a transformation instruction or an analytical instruction;

retrieving a plurality of code templates, each containing executable code and placeholders and corresponding to a respective one of the plurality of nodes, wherein the plurality of code templates is selected based on the first identity of the first software platform, and wherein the executable code is executable on the first software platform;

based on the execution order for the plurality of nodes, identifying parallel and dependent ones of said plurality of nodes and determining anode order sequence;

transforming the set of metadata into first generated executable code capable of execution on the first software platform based on the first plurality of code templates by merging the first executable code of the first plurality of code templates together based on the node sequence order; and replacing the placeholders in the first generated executable code based on the node properties;

creating a second code generation request specifying a second identity of a second software platform and the set of metadata;

retrieving a second plurality of code templates, each containing second executable code and second place holders and corresponding to a respective one of the plurality of nodes, wherein the second plurality of code templates is selected based on the second identity of the second software platform, and wherein the second executable code is executable on the second software platform; and transforming the set of metadata into second generated executable code capable of execution on the second software platform based on the second plurality of code templates by merging the second executable code of the second plurality of code templates together based on the node sequence order, wherein the first executable code is configured to be run on the first software platform to perform the data transformation instruction or the analytical instruction specified by the at least one of the plurality of node properties and the second executable code is configured to be run on the second software platform to perform the data transformation instruction or the analytical instruction specified by the at least one of the plurality of node properties.

5. The method of claim 4, wherein at least a portion of the generated executable code is configured when executed on the first software platform, to perform a data transformation operation on a data set based on the at least one of the plurality of node properties.

6. The method of claim 4, wherein at least a portion of the generated executable code is configured when executed on the first software platform, to perform an analytical operation on a data set based on the at least one of the plurality of node properties.

* * * * *